(12) United States Patent
Dankberg et al.

(10) Patent No.: US 7,974,571 B2
(45) Date of Patent: Jul. 5, 2011

(54) MULTI-ANTENNA SATELLITE SYSTEM WITH WIRELESS INTERFACE TO VEHICLE

(75) Inventors: Mark D. Dankberg, Encinitas, CA (US); Aniruddha Das, San Diego, CA (US); Mark J. Miller, Vista, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 620 days.

(21) Appl. No.: 11/818,972

(22) Filed: Jan. 9, 2008

(65) Prior Publication Data

US 2008/0261522 A1     Oct. 23, 2008

Related U.S. Application Data

(60) Provisional application No. 60/956,113, filed on Aug. 15, 2007, provisional application No. 60/884,143, (Continued)

(51) Int. Cl.
*H04H 1/00* (2006.01)
(52) U.S. Cl. ....... 455/3.02; 455/428; 455/13.3; 455/517
(58) Field of Classification Search .................. 455/427, 455/13.1, 13.2, 13.3, 12.1, 430, 501, 504, 455/502, 11.1, 3.02, 428, 458, 517, 552.1, 455/569.2; 370/321, 280
See application file for complete search history.

(56) References Cited

U.S. PATENT DOCUMENTS 5,233,626 A    8/1993  Ames
(Continued)

FOREIGN PATENT DOCUMENTS

EP    1608085 A    12/2005
(Continued)

OTHER PUBLICATIONS

Cummings, M. et al., "Mode Switching and Software Download for Software Defined Radio: The SDR Forum Approach", IEEE Communications Magazine, Aug. 1, 1999, pp. 104-106, vol. 37, No. 8, IEEE Service Center, Piscataway, US.

(Continued)

*Primary Examiner* — John Lee
(74) *Attorney, Agent, or Firm* — Kilpatrick Townsend & Stockton LLP

(57) ABSTRACT

A wireless satellite communication device is provided according to one embodiment of the invention. The wireless satellite communication device may include one or more satellite antennas, one or more local antennas and circuitry. A satellite antenna may be configured to communicate with one or more satellites. The local antenna may be configured to communicate with one or more wireless user devices within the vicinity of the wireless satellite communication device. The local antennas may include a local antenna. The circuitry may be coupled with the satellite antenna and the local antenna and may be configured to receive data from the satellite antenna and transmit the data with the local antenna. The wireless satellite communication device may also include a solar panel configured to provide electrical power to at least the satellite antenna, the local antenna, and the circuitry.

28 Claims, 21 Drawing Sheets

Related U.S. Application Data filed on Jan. 9, 2007, provisional application No. 60/884,134, filed on Jan. 9, 2007, provisional application No. 60/884,146, filed on Jan. 9, 2007, provisional application No. 60/884,142, filed on Jan. 9, 2007, provisional application No. 60/884,153, filed on Jan. 9, 2007, provisional application No. 60/884,190, filed on Jan. 9, 2007, provisional application No. 60/884,181, filed on Jan. 9, 2007, provisional application No. 60/884,180, filed on Jan. 9, 2007, provisional application No. 60/884,150, filed on Jan. 9, 2007, provisional application No. 60/884,152, filed on Jan. 9, 2007, provisional application No. 60/884,139, filed on Jan. 9, 2007, provisional application No. 60/884,147, filed on Jan. 9, 2007, provisional application No. 60/884,182, filed on Jan. 9, 2007, provisional application No. 60/884,130, filed on Jan. 9, 2007, provisional application No. 60/884,188, filed on Jan. 9, 2007, provisional application No. 60/884,140, filed on Jan. 9, 2007, provisional application No. 60/884,137, filed on Jan. 9, 2007, provisional application No. 60/884,156, filed on Jan. 9, 2007, provisional application No. 60/884,136, filed on Jan. 9, 2007, provisional application No. 60/884,138, filed on Jan. 9, 2007, provisional application No. 60/884,120, filed on Jan. 9, 2007, provisional application No. 60/884,210, filed on Jan. 9, 2007.

(56) References Cited

U.S. PATENT DOCUMENTS

| Patent/Pub No. | Date | Inventor |
|---|---|---|
| 5,319,673 A | 6/1994 | Briskman |
| 5,864,579 A | 1/1999 | Briskman |
| 5,867,109 A | 2/1999 | Wiedeman |
| 5,907,541 A | 5/1999 | Fairholm et al. |
| 5,995,495 A | 11/1999 | Sampson |
| 6,351,499 B1 * | 2/2002 | Paulraj et al. .......... 375/267 |
| 6,549,774 B1 | 4/2003 | Titlebaum et al. |
| 6,570,858 B1 * | 5/2003 | Emmons et al. ........ 370/321 |
| 6,927,736 B1 | 8/2005 | Kornbau et al. |
| 6,944,139 B1 | 9/2005 | Campanella |
| 6,954,446 B2 | 10/2005 | Kuffner |
| 6,975,600 B1 | 12/2005 | Vaughan et al. |
| 7,142,864 B2 | 11/2006 | Laroia et al. |
| 7,203,490 B2 | 4/2007 | Karabinis et al. |
| 7,260,369 B2 | 8/2007 | Feher |
| 7,280,810 B2 | 10/2007 | Feher |
| 7,634,232 B2 | 12/2009 | Waxman |
| 2002/0008412 A1 | 1/2002 | Patz et al. |
| 2002/0032003 A1 | 3/2002 | Avitzour et al. |
| 2002/0123344 A1 | 9/2002 | Criqui |
| 2003/0058834 A1 | 3/2003 | Soulie et al. |
| 2003/0181159 A1 | 9/2003 | Heinerscheid et al. |
| 2004/0072539 A1 | 4/2004 | Monte et al. |
| 2004/0110468 A1 * | 6/2004 | Perlman .............. 455/13.3 |
| 2004/0165689 A1 | 8/2004 | Akopian et al. |
| 2005/0042999 A1 | 2/2005 | Rappaport |
| 2005/0141644 A1 | 6/2005 | Sadowsky |
| 2005/0162306 A1 | 7/2005 | Babitch et al. |
| 2005/0181752 A1 | 8/2005 | Sahota |
| 2005/0227631 A1 | 10/2005 | Robinett |
| 2005/0265273 A1 | 12/2005 | Karabinis et al. |
| 2005/0281221 A1 | 12/2005 | Roh et al. |
| 2006/0009177 A1 | 1/2006 | Persico et al. |
| 2006/0165120 A1 | 7/2006 | Karabinis |
| 2006/0273967 A1 | 12/2006 | Gat |
| 2006/0280262 A1 | 12/2006 | Malludi |
| 2007/0030116 A1 | 2/2007 | Feher |
| 2007/0032220 A1 | 2/2007 | Feher |
| 2007/0032246 A1 | 2/2007 | Feher |
| 2007/0032266 A1 | 2/2007 | Feher |
| 2007/0032832 A1 | 2/2007 | Feher |
| 2007/0153731 A1 | 7/2007 | Fine |
| 2007/0155319 A1 | 7/2007 | Monte et al. |
| 2007/0167187 A1 | 7/2007 | Rezvani et al. |
| 2007/0184849 A1 | 8/2007 | Zheng |
| 2007/0202890 A1 | 8/2007 | Feher |
| 2007/0238483 A1 | 10/2007 | Boireau et al. |
| 2008/0089269 A1 | 4/2008 | Tsutsui |
| 2008/0247351 A1 | 10/2008 | Dankberg et al. |
| 2009/0034448 A1 | 2/2009 | Miller et al. |

FOREIGN PATENT DOCUMENTS

| | | |
|---|---|---|
| KR | 97-007605 | 2/1994 |
| KR | 1994-0013241 | 6/1994 |
| KR | 1999-0072064 | 9/1999 |
| KR | 10-2004-0019952 | 3/2004 |
| WO | WO 01/33738 A | 5/2001 |
| WO | WO 01/45300 A | 6/2001 |
| WO | WO 2006/018678 A | 2/2006 |

OTHER PUBLICATIONS

Dagres, L. et al., "Flexible-Radio: A General Framework with PHY-layer algorithm-design insights", The International Conference on Belgrade, Serbia and Montenegro Nov. 21-24, 2005, Computer as a Tool, 2005, Eurocon 2005, Nov. 21, 2005, pp. 120-123, vol. 1, IEEE Piscataway, US.

Kaiser, Thomas et al., "Smart Antennas—State of the Art,"EURASIP, no date, 1 page.

Liolis, Konstantinos P. et al., "Multi-Satellite MIMO Communications at Ku-Band and Above: Investigations on Spatial Multiplexing for Capacity Improvement and Selection Diversity for Interface Mitigation,"EURASIP Journal on Wireless Communication and Networking, Hindawi Publishing Co., vol. 2007, Article ID59608, 11 pages.

Mietzner, Jan et al., "Distributed Space-Time Codes for Cooperative Wireless Networks in the Presence of Different Propagation Delays and Path Losses," Proc. 3rd IEEE Sensor Array Multichannel Signal Processing Workshop (SAM 2004), Sitges, Barcelona, Spain, Jul. 2005, 6 pages.

Yamashita, Fumihiro et al., "Broadband Multiple Satellite MIMO System," IEEE, 0-7803-9152-7/05, 2005, pp. 2632-2636.

Non-Final Office Action of Mar. 16, 2011 for U.S. Appl. No. 11/971,852; 21 pages.

Notice of Allowance of Jan. 5, 2011 for U.S. Appl. No. 12/080,968; 11 pages.

International Search Report and Written Opinion for PCT Patent Application No. PCT/US2008/050620 mailed on Oct. 23, 2008; 16 pages.

International Search Report and Written Opinion for PCT Patent Application No. PCT/US2008/050621 mailed on Jun. 11, 2008; 10 pages.

International Search Report and Written Opinion for PCT Patent Application No. PCT/US2008/050623 mailed on Jun. 27, 2008; 10 pages.

* cited by examiner

MULTI-ANTENNA SATELLITE SYSTEM WITH WIRELESS INTERFACE TO VEHICLE

CROSS-REFERENCES TO RELATED APPLICATIONS

This application is a non-provisional, and claims the benefit, of the following commonly assigned U.S. Provisional Patent Applications, which are all incorporated by references for all purposes:

U.S. Provisional Patent Application No. 60/884,143, filed Jan. 9, 2007 entitled "MIMO Satellite Subscriber Terminal";

U.S. Provisional Patent Application No. 60/884,134, filed Jan. 9, 2007 entitled "Dynamic Switching Between Antennas";

U.S. Provisional Patent Application No. 60/884,146, filed Jan. 9, 2007 entitled "Antenna Configuration for Wireless Multipath Signal Reception of Satellite Signals";

U.S. Provisional Patent Application No. 60/884,142, filed Jan. 9, 2007 entitled "MIMO Antenna with Gain on Horizon for Satellite Communications";

U.S. Provisional Patent Application No. 60/884,153, filed Jan. 9, 2007 entitled "Satellite Terrestrial Hybrid with Additional Content on Terrestrial";

U.S. Provisional Patent Application No. 60/884,190, filed Jan. 9, 2007 entitled "Use of Different Coding and Modulation for Satellite MIMO";

U.S. Provisional Patent Application No. 60/884,181, filed Jan. 9, 2007 entitled "Satellite Terrestrial Hybrid Using Same Frequency and MIMO";

U.S. Provisional Patent Application No. 60/884,180, filed Jan. 9, 2007 entitled "Two Satellites on Same Frequency to MIMO Subscriber Terminals";

U.S. Provisional Patent Application No. 60/884,150, filed Jan. 9, 2007 entitled "Coordinated Multiple Antenna Array for MIMO Communication with Satellite and Terrestrial Signals";

U.S. Provisional Patent Application No. 60/884,152, filed Jan. 9, 2007 entitled "Multi-Antenna System with Wireless Interface to Vehicle";

U.S. Provisional Patent Application No. 60/884,139, filed Jan. 9, 2007 entitled "Dynamic Switching between Different Sets of Antennas and Associated Subscriber Terminals";

U.S. Provisional Patent Application No. 60/884,147, filed Jan. 9, 2007 entitled "Base Station Reduction in Mobile Satellite Systems";

U.S. Provisional Patent Application No. 60/884,182, filed Jan. 9, 2007 entitled "Delay Tolerant MIMO Using Rolling Pilots";

U.S. Provisional Patent Application No. 60/884,130, filed Jan. 9, 2007 entitled "Directional Analog Beam Forming";

U.S. Provisional Patent Application No. 60/884,188, filed Jan. 9, 2007 entitled "Switch Transceiver Between One MIMO or an Independent SISO";

U.S. Provisional Patent Application No. 60/884,140, filed Jan. 9, 2007 entitled "MIMO Antenna with Polarization Diversity for Satellite Communications";

U.S. Provisional Patent Application No. 60/884,137, filed Jan. 9, 2007 entitled "Scalable Satellite Deployment";

U.S. Provisional Patent Application No. 60/884,156, filed Jan. 9, 2007 entitled "Signal Processing for Diverse Antenna Elements";

U.S. Provisional Patent Application No. 60/884,136, filed Jan. 9, 2007 entitled "Signal Scanning for Determination of Dynamic Switching Between Antennas";

U.S. Provisional Patent Application No. 60/884,138, filed Jan. 9, 2007 entitled "State Based Dynamic Switching Between Antennas";

U.S. Provisional Patent Application No. 60/884,120, filed Jan. 9, 2007 entitled "Layered Space-Time Processing";

U.S. Provisional Patent Application No. 60/884,210, filed Jan. 9, 2007 entitled "MIMO Mobile Satellite System"; and U.S. Provisional Patent Application No. 60/956,113, filed Aug. 15, 2007 entitled "Satellite MIMO System".

This disclosure relates without limitation in general to satellite communication and to satellite communication with wireless devices within a vehicle among other things.

BACKGROUND

Wireless communication devices have become ubiquitous. Consumer and business communication devices, such as cell phones, computers, personal digital assistants (PDAs), smart phones, etc are configured with wireless connectivity. These data networks may include cellular networks, high speed data networks, Wi-Fi networks, or WiMax networks, for example. However, these devices must be used within the wireless network coverage area and/or within a given distance from a wireless network access point such as a cell tower or a wireless router. Outside the coverage area, these devices do not provide wireless network connectivity.

BRIEF SUMMARY

Embodiments of the invention include various wireless satellite communication devices and methods. A wireless satellite communication device according to one embodiment of the invention includes at least one satellite antenna and at least one local antenna. This wireless satellite communication device provides network connectivity for one or more or local wireless devices through a satellite. Using the satellite antenna the wireless satellite communication device communicates with a gateway through at least one satellite and communicates with one or more local wireless devices with the local antenna.

For example, the wireless satellite communication device may provide wireless connectivity between a laptop used within an automobile and a gateway through a satellite. The gateway may be coupled with the Internet. The wireless satellite communication device may communicate with the laptop using Wi-Fi and with the satellite with any type of satellite communication protocol. Accordingly, the wireless satellite communication device may include at least one satellite antenna and a local Wi-Fi antenna. As another example, a wireless satellite communication device acts as a wireless satellite access point for wireless communication devices within the vicinity.

In one embodiment, the present disclosure provides for a multiple antenna vehicular communications interface. Multiple antennas in communication with a satellite and/or terrestrial antenna may be coupled with a local antenna wirelessly in communication with the vehicle, vehicle systems, and/or wireless communications devices within or near the vehicle.

According to another embodiment of the invention, a wireless satellite communication device is provided that may include one or more satellite antennas, one or more local antennas and circuitry. The satellite antenna may be configured to communicate with one or more satellites and/or terrestrial receivers. The local antenna may be configured to communicate with one or more wireless communication devices within the vicinity of the wireless satellite communication device. The circuitry may couple the satellite antenna with the local antenna and may be configured to receive data from the satellite antenna and transmit the data with the local antenna. The wireless satellite communication device may also include a battery configured to provide power to at least the satellite antenna, the local antenna, and the circuitry. The battery may be a rechargeable battery. The wireless satellite communication device may also include a solar panel configured to provide electrical power to at least the satellite antenna, the local antenna, and/or the circuitry.

The circuitry included with the wireless satellite communication device may be configured to receive data from a satellite through the satellite antenna with a first channel access protocol and transmit the data with the local antenna with a second channel access protocol. The circuitry may also be configured to receive data from the local antenna and transmit the data to a satellite through the satellite antenna. The circuitry may also be configured to receive data from the local antenna with a second channel access protocol and transmit the data to a satellite through the satellite antenna with a first channel access protocol.

In various embodiments, the local antenna of the wireless satellite communication device may be configured to communicate with the one or more wireless user devices using an IEEE 802.11 standard. The wireless satellite communication device may be coupled with the exterior of a vehicle, for example, using one or more magnets. The local antenna may be coupled with the exterior and/or the interior of the vehicle.

A wireless satellite communication device comprising one or more satellite antennas, a local antenna, circuitry and at least one solar panel is provided according to one embodiment of the invention. The one or more satellite antennas may be configured to communicate with one or more satellites. The local antenna may be configured to communicate with one or more wireless communication devices within the vicinity of the wireless satellite communication device. The circuitry may be coupled with the satellite antenna and the local antenna. The circuitry may be configured to receive data from the satellite antenna and transmit the data to the wireless communication devices with the local antenna. The solar panel may be configured to convert solar radiation to electric power and the solar panel may be coupled with the satellite antenna, the local antenna, and the circuitry. The wireless satellite communication device may also include a battery configured to store electrical power from the solar panel that is coupled with the satellite antenna, the local antenna, and the circuitry.

A wireless satellite communication device coupled with a vehicle is also disclosed according to one embodiment of the invention. The wireless satellite communication device may include a vehicle including an exterior and an interior, a satellite antenna, a local antenna, and circuitry. The satellite antenna may be coupled with the exterior of the vehicle and configured to communicate with a satellite. The local antenna may be configured to communicate with one or more wireless communication devices within the vehicle. The circuitry may be coupled with the satellite antenna and the local antenna. The circuitry may be configured to receive data from the satellite antenna and transmit the data to the wireless communication devices with the local antenna. The local antenna may be coupled with the interior and/or the exterior of the vehicle.

A method for providing wireless satellite communication with wireless devices within a vehicle is also provided according to one embodiment of the invention. The method may include receiving data from one or more satellites through one or more satellite antennas coupled with the vehicle and transmitting the data to one or more wireless communication devices within or near the vehicle through at least one access point coupled with the vehicle. The method may further include receiving data from one or more wireless communication devices through an access point; and transmitting the data to one or more satellites through one or more satellite antennas.

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

A wireless satellite communication device is disclosed according to one embodiment of the invention that provides wirelessly satellite network connectivity. The wireless satellite communication device may connect one or more wireless user devices with a satellite network. The wireless satellite communication device may include one or more local antennas configured to communicate with wireless user devices within the vicinity of the wireless satellite communication device. The wireless satellite communication device may also include a satellite antenna configured to communicate with a gateway through a satellite. The satellite antenna may provide network access through the gateway. For example, a wireless user device may connect to the Internet through the wireless satellite communication device.

According to one embodiment of the invention wireless user devices may connect with a wireless satellite communication device within a vehicle. In such embodiments the local antenna may be a vehicle antenna. The vehicle antenna may be coupled with either the interior or the exterior of the vehicle. Thus, passengers within the vehicle may access network resources through the wireless satellite communication device. The vehicle may include an automobile, train, airplane, a boat or the like.

In another embodiment of the invention the wireless satellite communication device may be a portable wireless satellite communication device that is not coupled with a vehicle.

Figure 1A:
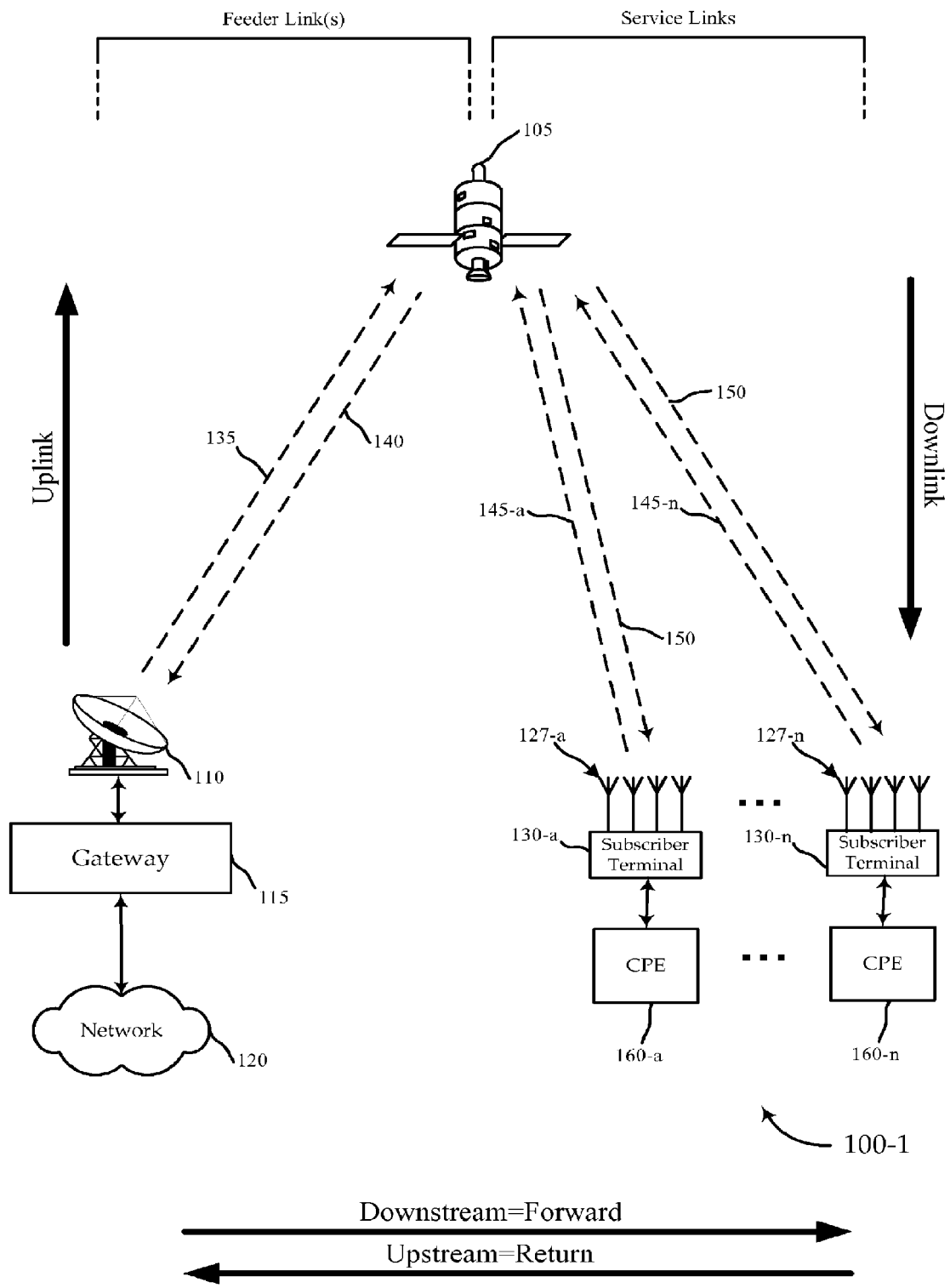
FIG. 1A shows a couple of wireless satellite communication devices in communication with a gateway through a satellite according to one embodiment of the invention.

Moreover, embodiments of the invention may also provide for a multiple input multiple output (MIMO) satellite system. Referring to FIG. 1A, an embodiment of a MIMO satellite system 100-1 is shown. Multiple antennas 127 coupled with each wireless satellite communication device 130 allow MIMO techniques to be used. MIMO systems can operate with both spatial multiplexing and diversity benefits. In this embodiment, a gateway 115 is coupled with a network 120, for example, the Internet. The gateway 115 uses a satellite dish 110 to bi-directionally communicate with a satellite 105 on a feeder link. An upstream forward link 135 communicates information from the gateway 115 to the satellite 105, and a downstream return link 140 communicates information from the satellite 105 to the gateway 115. Although not shown, there may be a number of gateways 115 in the system 100.

The satellite 105 could perform switching or be a bent-pipe. Information bi-directionally passes through the satellite 105. The satellite 105 could use antennas or phased arrays when communicating. The communication could be focused into spot beams or more broadly cover a bigger geographical area, for example, the entire continental US (CONUS). Satellites 105 have trouble reaching wireless satellite communication devices 130 through foliage or other obstructions. At certain frequencies, even weather and other atmospheric disturbances can cause a satellite signal to fade.

The wireless satellite communication devices 130 in this embodiment are bi-directionally coupled to the satellite 105 to provide connectivity with the network 120. Each wireless satellite communication device 130 can receive information with a shared forward downlink 150 from the satellite 105, and transmit information is sent on a number of return uplinks 145. Each wireless satellite communication device 130 can initiate an return uplink 145 to send information upstream to the satellite 105 and ultimately the gateway 115.

This embodiment has multiple antennas on the wireless satellite communication device 130. The wireless satellite communication device 130 can be in a fixed location or can be mobile. In this embodiment, the wireless satellite communication device 130 interacts with a single transceiver in the satellite 105. Other embodiments could allow the wireless satellite communication device 130 to interact with multiple transceivers that may be orbitally located or non-orbital (e.g., air, ground or sea based). Some embodiments of the wireless satellite communication device 130 allow switching between these modes.

The physical layer between the satellite and the wireless satellite communication device operates in single-input multiple-output (SIMO) for the downlink and multiple-input single-output (MISO) for the uplink. MISO and SIMO are two degenerated cases of MIMO, where MISO has a single transmitter and SIMO has a single receiver. Generally, MIMO involves multiple transmit and/or receive engines coupled to respective antennas. In various embodiments, the antennas are configured to have independent fading with a spacing distance of ¼, ½ or a full wavelength. The system 100 includes at least one of spatial multiplexing, transmit diversity methods (e.g., space-time coding, code reuse multiple access, etc.), and/or beamforming technologies. Various embodiments can use any number or permutation of these features in implementing the system 100.

Generally, transmission diversity sends some or all of the same information on two distinguishable channels. Physical separation, angular diversity, code division, frequency division, time division, or other techniques can be used to distinguish the channels and increase the gain. Spatial multiplexing generally allows greater throughput by sending partially or fully unique data down a number of channels in parallel. There is an interplay between increases in gain from use of diversity and increases in throughput using spatial multiplexing. For example, diversity can be emphasized to achieve increases in gain at the expense of throughput.

Figure 1B:
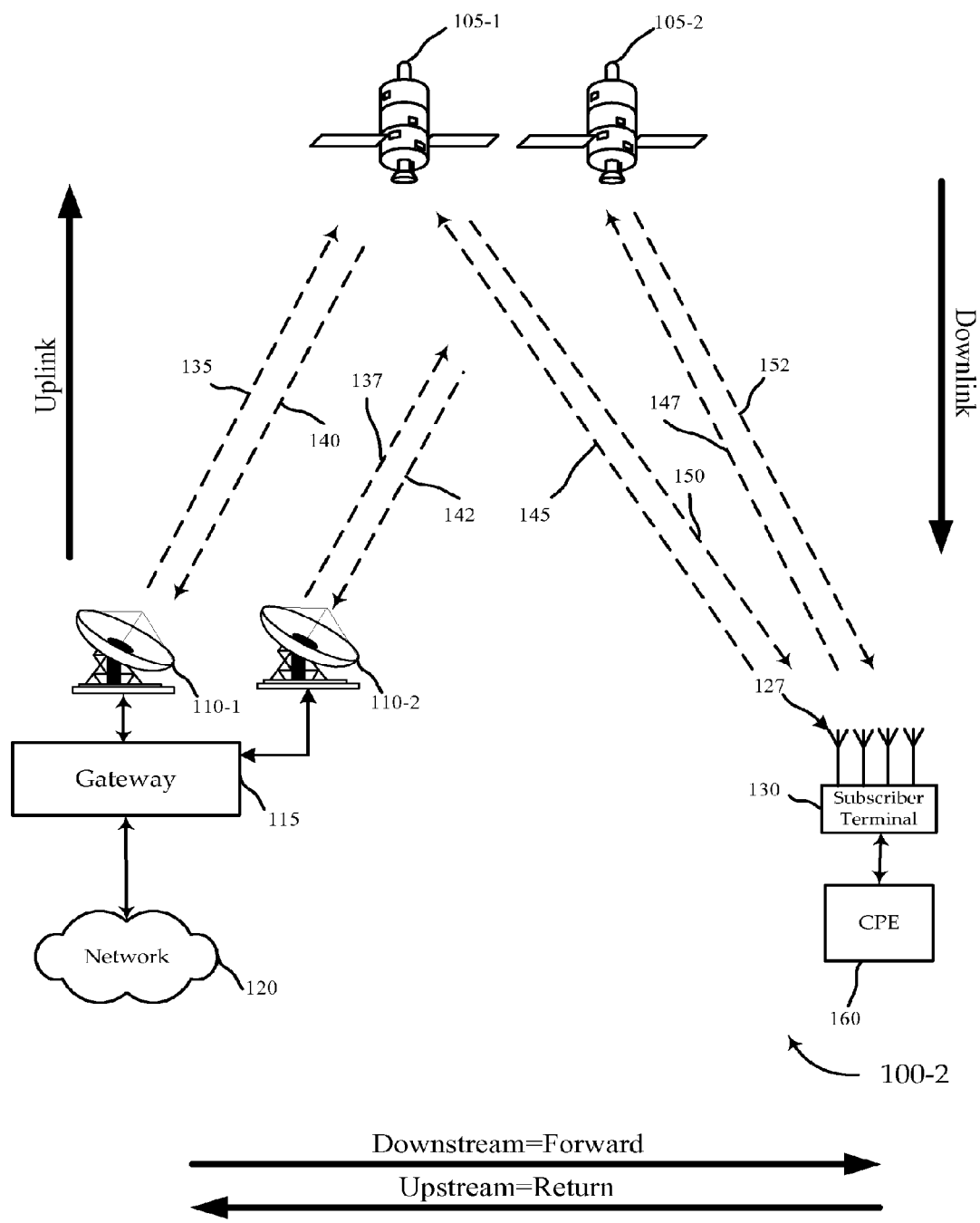
FIG. 1B shows a couple of wireless satellite communication devices in communication with a gateway utilizing two satellite dishes through two satellites according to one embodiment of the invention.

Referring next to FIG. 1B, another embodiment of a satellite system 100-2 is shown. This embodiment has two satellites 105 that act cooperatively as multiple transmitters and receivers in a MIMO configuration. The satellites 105 are geographically separated by orbit or orbital slot, but other techniques can be used to further achieve diversity. Low earth orbit (LEO), geostationary or elliptical orbits may be variously used by the satellites 105.

Figure 1C:
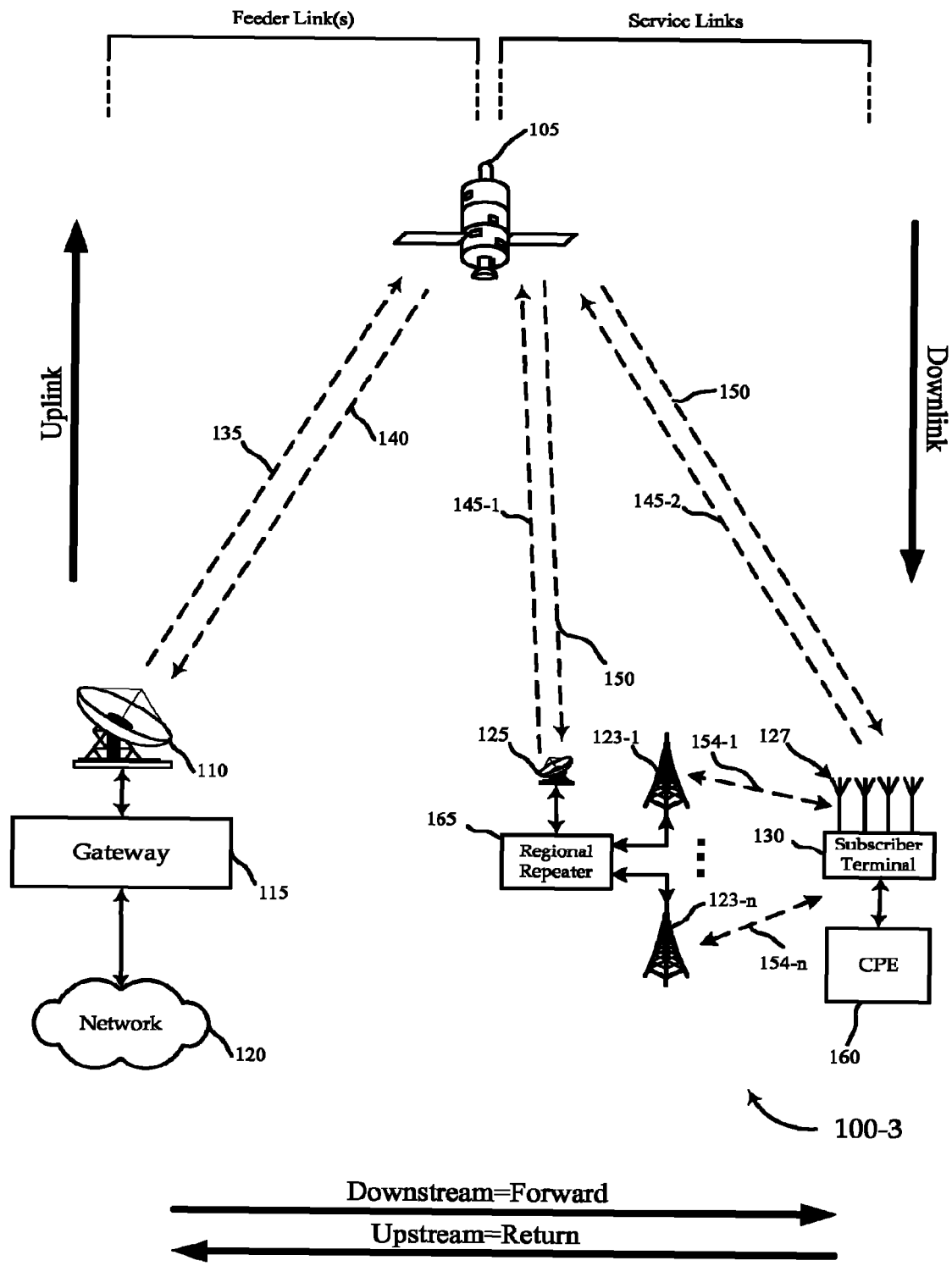
FIG. 1C shows a wireless satellite communication device in communication with a gateway through a satellite and/or one or more terrestrial repeaters according to one embodiment of the invention.

With reference to FIG. 1C, yet another embodiment of the satellite system 100-3 is shown. This embodiment uses a number of terrestrial repeaters (or regional repeaters) 165. The terrestrial repeaters 165 are distributed around to allow enhanced coverage. At any given moment, a subscriber may be able to communicate with a few terrestrial repeaters 165 and/or the satellite 105. A service link between the terrestrial repeater antenna 125 and the satellite 105 allow relaying activity on a terrestrial link(s) 154. Some type of diversity is used to distinguish the satellite signal(s) from the repeater signal(s).

The wireless satellite communication device 130 achieves MIMO benefits by using both satellite(s) and terrestrial repeater(s). The terrestrial repeater 165 can be located anywhere sub-orbital (e.g., a balloon, an aircraft, ground-based, on buildings, ship-mounted, on a High Altitude Platform (HAP), etc.). This embodiment shows the terrestrial repeater having a multiple terrestrial antenna 123, but other embodiments could have a single terrestrial antenna 123 for each terrestrial repeater 165. Even though this embodiment only shows a single satellite 105, other embodiments could have multiple satellites 105.

Figure 1D:
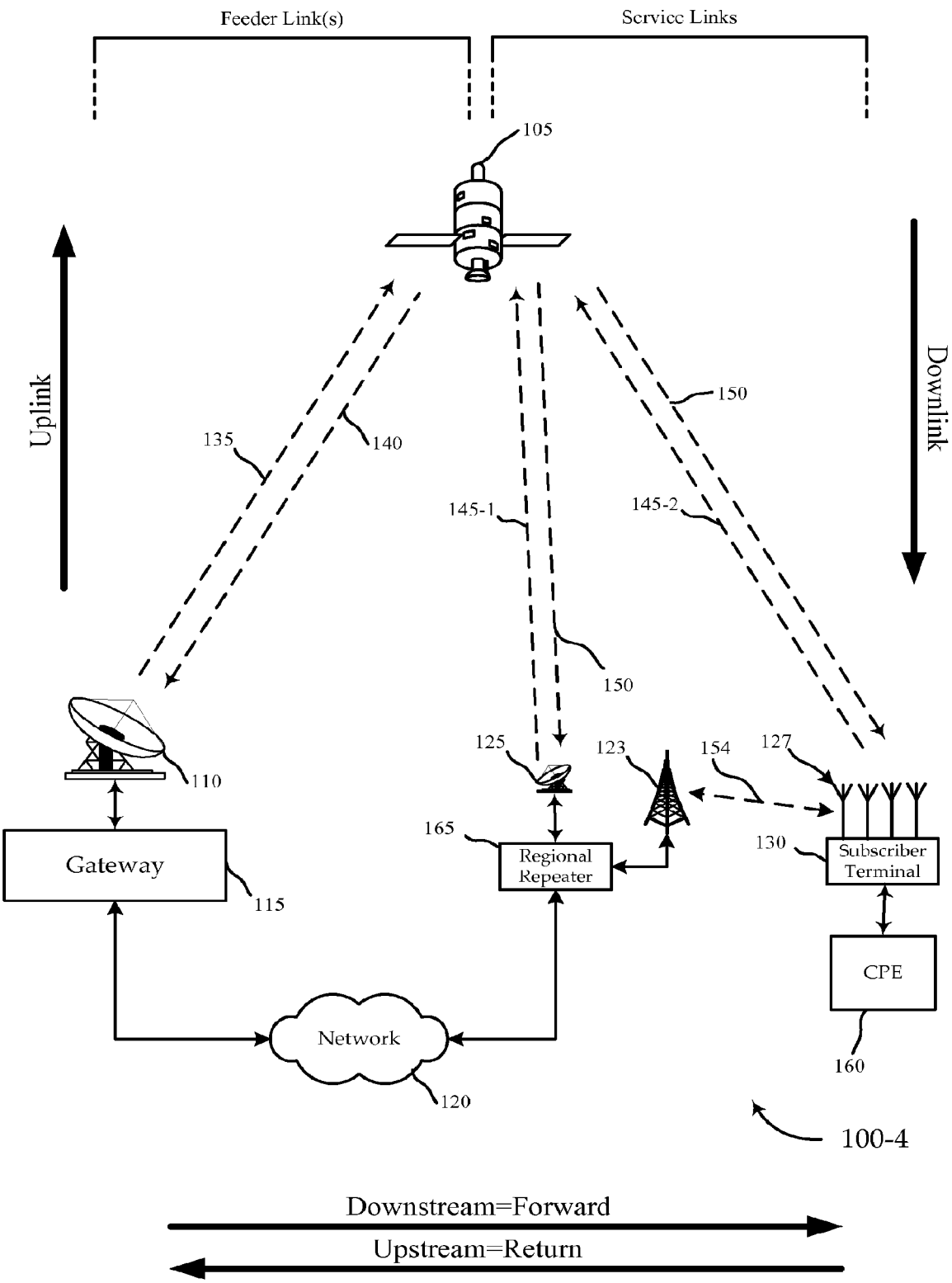
FIG. 1D shows a wireless satellite communication device in communication with a gateway through a satellite and/or one or more terrestrial repeaters according to one embodiment of the invention.

Referring to FIG. 1D, still another embodiment of the satellite system 100-4 is shown. This embodiment uses terrestrial repeaters that can use either a service link 145-1, 150 or a network connection to relay communication of the terrestrial link 154. Each terrestrial repeater 165 in this embodiment uses a single transceiver and antenna 123 for terrestrial communication. An algorithm can divide traffic between the service link and network link when both are available.

Figure 2A:
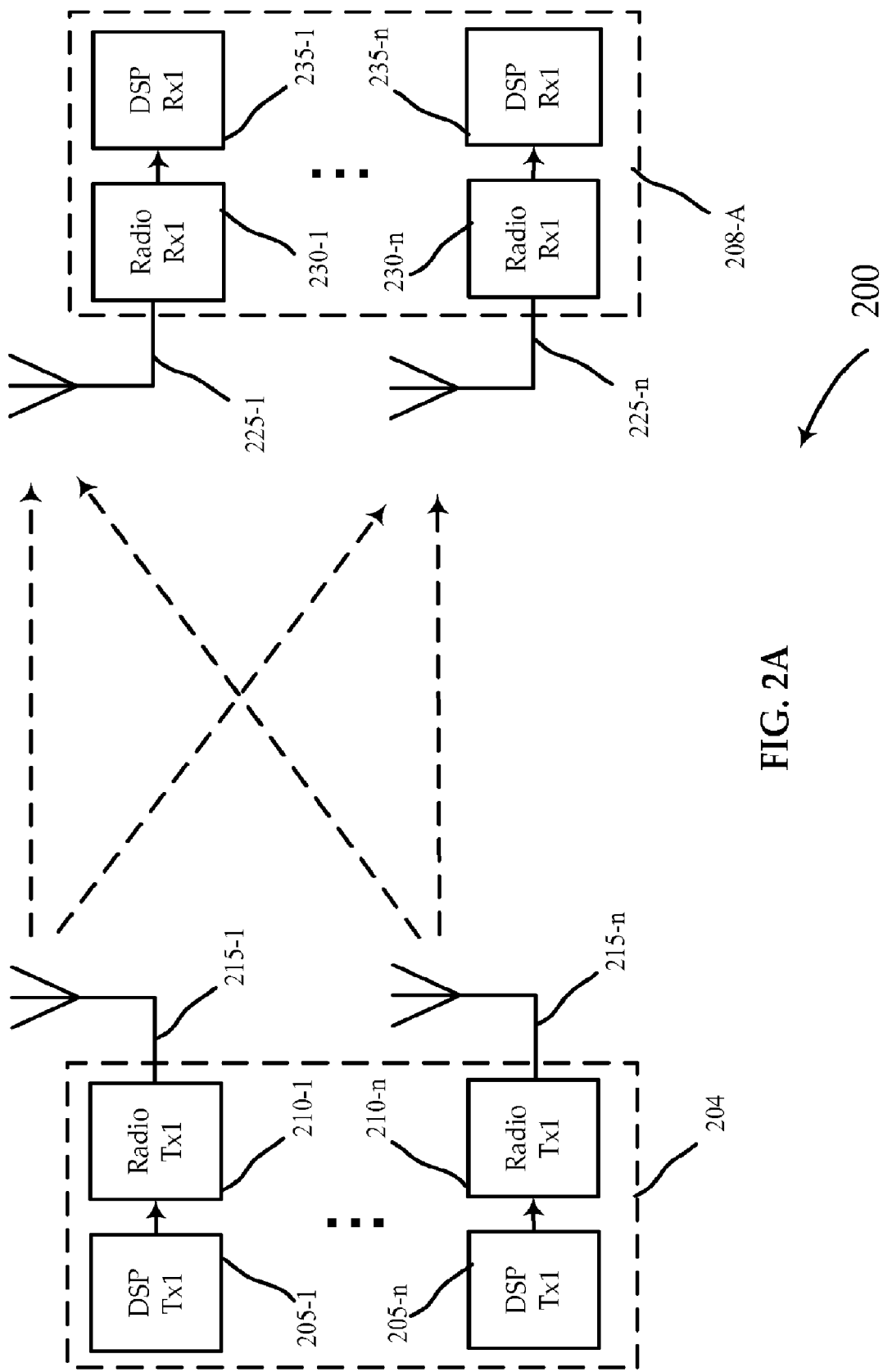
FIGS. 2A and 2B each show a multiple-input multiple-output (MIMO) transmitter and receiver according to embodiments of the invention.

Turning to FIG. 2A, a system 200 is shown which illustrates a variety of alternative communication schemes that may be leveraged in the system 100 set forth related to FIG. 1. The system includes a set of transmitters 204 and a receiver (e.g., a user terminal of FIG. 1). The system includes two diverse (e.g., spatial, angular, or polarization diversity) antennas (215-*a* and 215-*b*) for the transmitters. In one embodiment, one antenna (e.g., 215-*a*) is on a satellite (e.g., 105-*a*) and the other antenna (e.g., 215-*b*) is at a base station 110. In one embodiment, one antenna (e.g., 215-*a*) is on a first satellite (e.g., 105-*a*) and the other antenna (e.g., 215-*b*) is at a second satellite (e.g., 105-*b*). The antennas (215) may, in other embodiments, be one the same satellite.

Each antenna (215, 225) may be made up of one or more individual antenna elements. Each antenna may be a fixed or phased array of, for example, monopoles or reflectors, or any other type or configuration know in the art. A variety of types of beam forming may be used by adaptively controlling the processing of patterns, orientations, and polarizations to improve performance, as discussed below or known in the art.

In one embodiment, the transmitters 250 process two separate data streams at the DSPs 205, and then perform a D/A conversion, upconvert, and amplify each stream using RF transmit components 210 to create the separate signals. Each signal 220 is transmitted at the same time using each respective antenna (215-*a* and 215-*b*). At the user terminal 208 diverse (e.g., spatial, angular, or polarization diversity) antennas (225-*a* and 225-*b*) each receive a copy of each signal, and process the signals. RF receive components 230 amplify, downconvert, and perform A/D conversion, and DSPs 235 process each digitized signals.

In one embodiment, various techniques are used (e.g., by the systems 100, 200 of FIG. 1 or 2) to process data streams. In one embodiment, diversity techniques (e.g., selection combining, equal gain combining, maximal ration combining (MRC), certain space-time codes, or hybrid methods) are used. In another embodiment, spatial multiplexing techniques may be used to process independent data streams. In other embodiments, spatial multiplexing techniques may be used in combination with diversity techniques and/or space-time codes. A variety of techniques may be used, including various space-time block codes, space-time trellis codes, super-orthogonal space time trellis codes, differential space-time modulation, decision feedback equalization combined with zero forcing or minimum mean square error (MMSE) (e.g., Bell Labs Layered Space-Time (BLAST) architectures), and combination techniques.

Figure 2B:
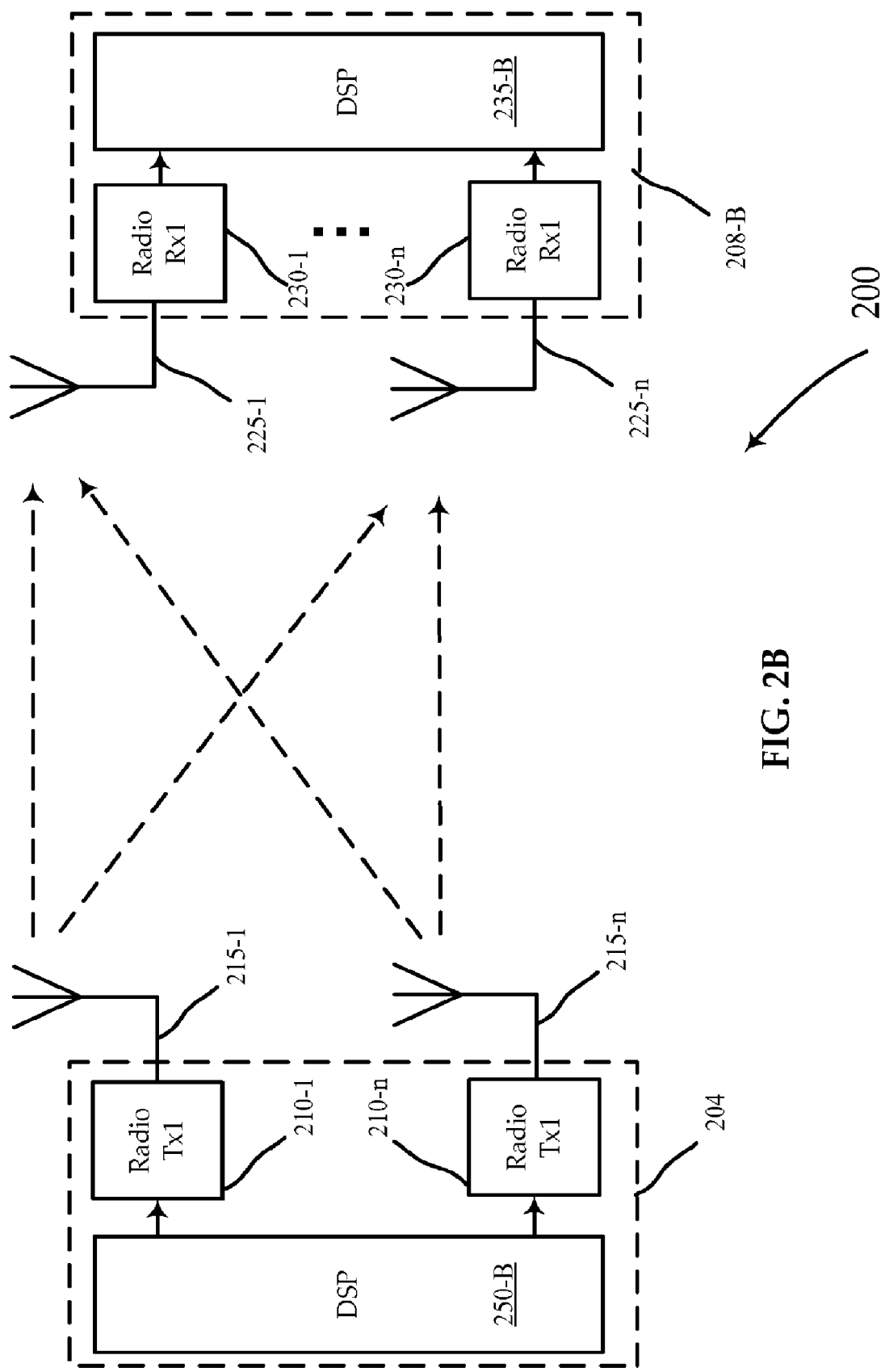

FIG. 2B shows a system similar to the one shown in FIG. 2A. In this embodiment, however, the transmitter 204 includes a single DSP 250-B and the user terminal 208 includes a single DSP 235-B. These single DSPs 250-B, 235-B may provide the joint processing of the signals received from the radios 230. Thus, these DSPs 250-B, 235-B may provide MIMO functionality.

The above descriptions related to FIGS. 2A and 2B are examples only. In other embodiments, there may be any combination of N transmit antennas and M receive antennas, where N and M are each greater than or equal to one. Also, although the description above relates to the downstream signals, the description applies to upstream, transmissions, as well, e.g., from the user terminal 120 to satellite(s) 105, or satellite 105 and terrestrial 110, antennas.

Figure 3:
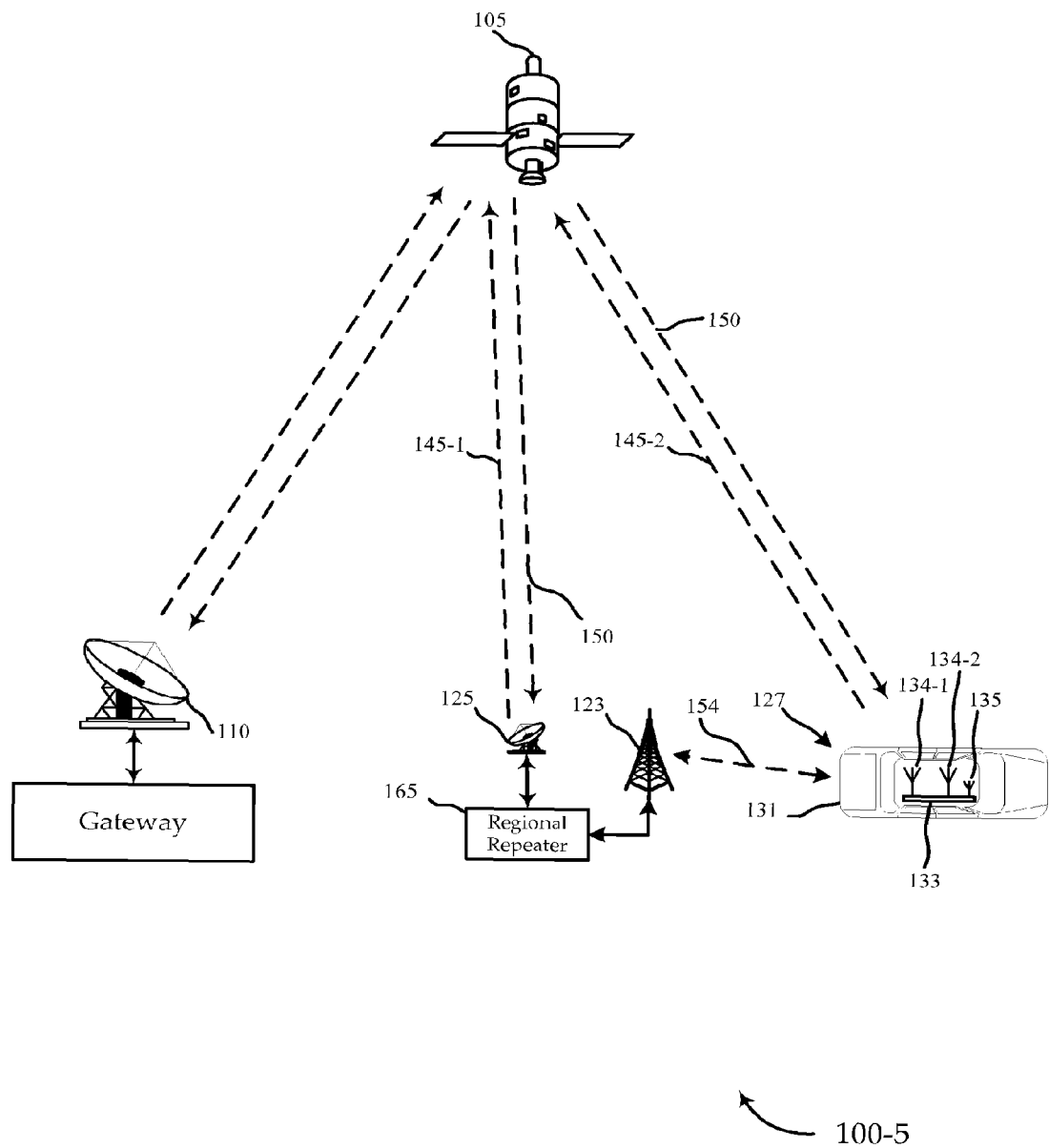
FIG. 3 shows a wireless satellite communication device coupled with a car in communication with a gateway through a satellite and/or terrestrial repeater according to one embodiment of the invention.

FIG. 3 shows a multi-antenna satellite system with a local antenna 135 interfaced with devices within or part of a vehicle 131 according to one embodiment of the invention. A vehicle 131 in this embodiment includes a wireless satellite communication device 133 in communication with a satellite 105 and/or terrestrial repeater 123 or both. The wireless satellite communication device 133 includes two satellite antenna 134-1, 134-2 in communication with the satellite 105 and terrestrial antenna 123, as well as a local antenna 135. The satellite antennas 134-1, 134-2 may communicate with the two or more satellites with MIMO.

The satellite antenna 134-1, 134-2 and the local antenna 135 may be included within a single unit. The satellite antenna 134-1, 134-2 and the local antenna 135 may be powered by a single power cable from the vehicle.

When signals are received at the satellite antennas 134-1, 134-2 the signals may be translated into a new communications format by a digital signal processor (DSP) and sent to local antenna 135, according to one embodiment of the invention. The DSP may buffer portions of the signal, clean the signal, apply MIMO algorithms, and/or other signal processing to ensure the proper data is sent and received in the proper format to the end system.

Figure 4A:
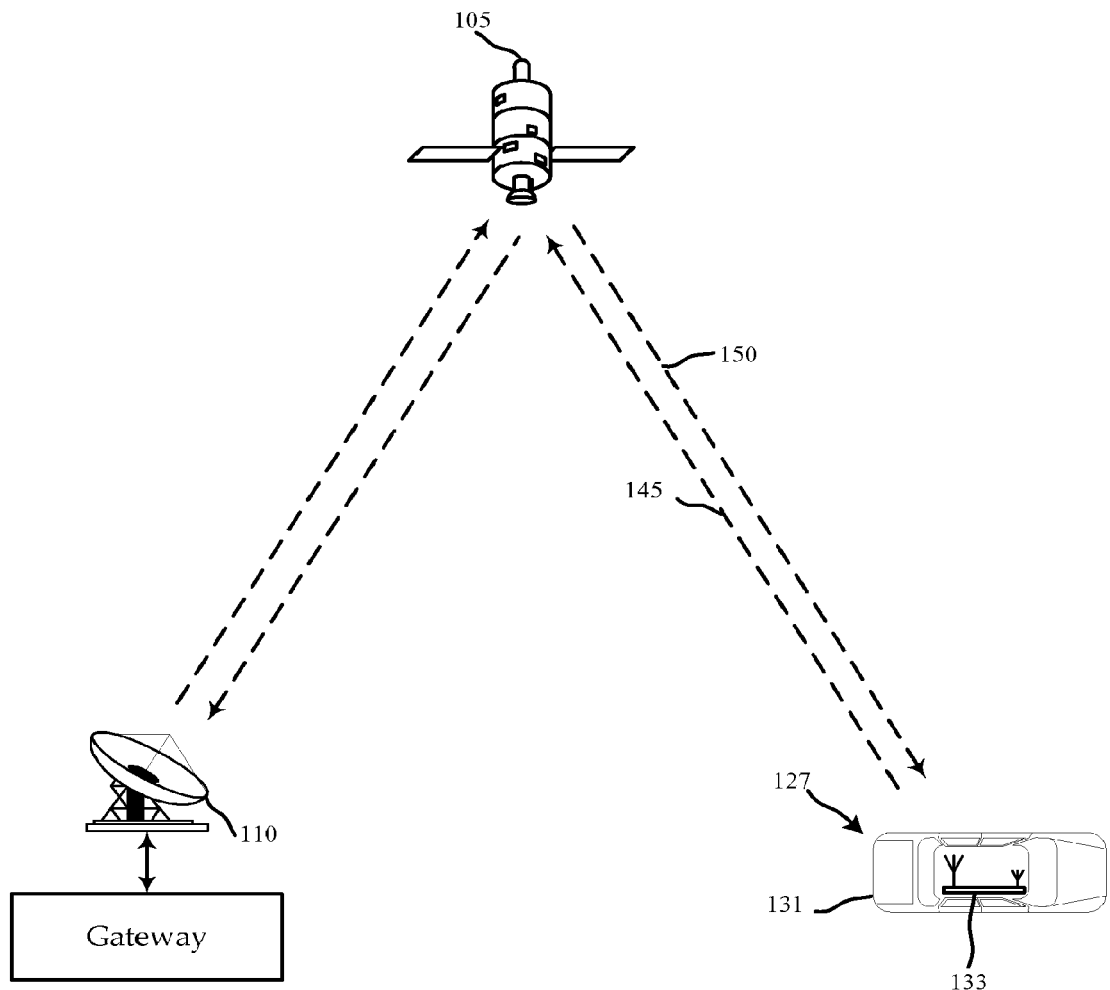
FIG. 4A shows a wireless satellite communication device with a single satellite and a local antenna coupled with a vehicle in communication with a single satellite according to one embodiment of the invention.

FIG. 4A shows a multi-antenna wireless satellite communication device with a wireless interface to a vehicle 131 in communication with one satellite 105 according to one embodiment of the invention. The wireless satellite communication device may also be in communication with any combination of repeaters, satellites and/or terrestrial antennas, and/or one or more terrestrial repeaters or any combination thereof.

Figure 4B:
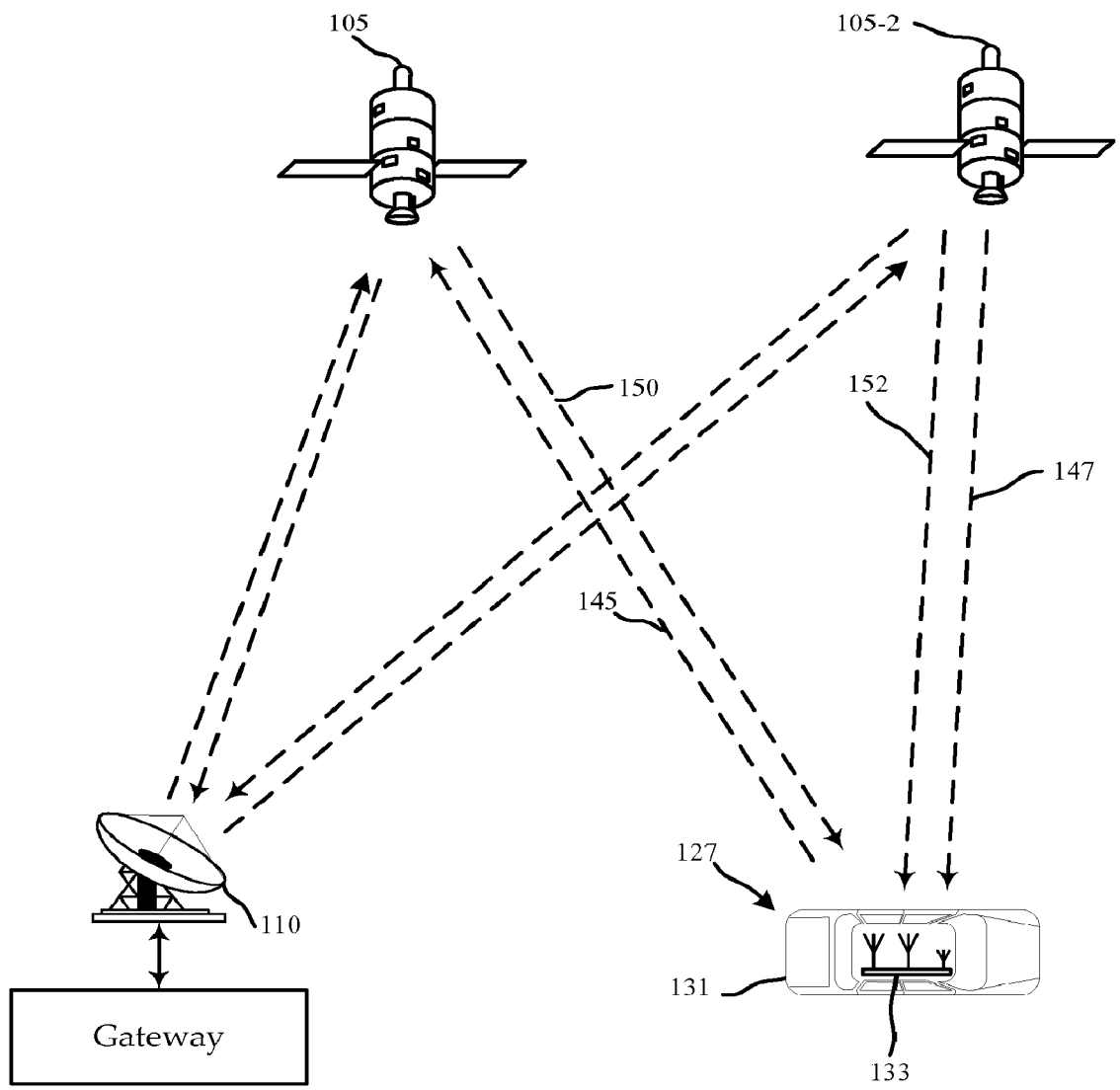
FIG. 4B shows a wireless satellite communication device with two satellite antennas in communication with two satellites and a local antenna coupled with a vehicle according to one embodiment of the invention.

FIG. 4B shows a multi-antenna satellite system with a wireless interface to a vehicle 131 in communication with two satellites 105-1, 105-2 according to one embodiment of the invention. The wireless satellite communication device may also be in communication with any combination of repeaters, satellites and/or terrestrial antennas, and/or one or more terrestrial repeaters or any combination thereof.

The local antenna in various embodiments of the invention may wirelessly communicate with electrical systems such as, for example, an in-car computer, a radio, time-traffic displays, weather displays, law enforcement and/or health and safety computers or systems, global positioning systems, telemetry systems, mobile phones, gaming devices, computers, televisions, smart phones, iPhones, monitors, weather systems, etc. The local antenna may communicate with any short distance wireless standard such as, for example, Wireless USB, VOIP, LNA, Wi-Fi, Bluetooth, ZigBee, WLAN, IRDa, etc. Moreover, the local antenna may simultaneously communicate with multiple devices in multiple standards.

The wireless satellite communication device 133 may be located on or within the vehicle 131 or both. In one embodiment, the wireless satellite communication device 133 is located within the passenger compartment of a vehicle, for example, under a seat or within the trunk of a car. The wireless satellite communication device may partially be placed on the exterior of the vehicle 131 with a portion on the interior; for example, the satellite antennas 134-1, 134-2 may be placed on the exterior of an airplane while the local antenna 135 may be placed within the airplane. The wireless satellite communication device 133 may be attached to the top, front, sides or rear of the vehicle 131. The wireless satellite communication device 133 may placed on or near a window. For example, the wireless satellite communication device 133 may be placed on the roof of a car near the back window. The local antenna 135 may then be placed on the near the window for better communication within the vehicle. There are many other combinations that will be apparent to those skilled in the art upon reading this disclosure.

In another embodiment of the invention, the satellite antenna 134-1, 134-2 may be placed on the exterior of the vehicle 131, and the local antenna 135 may be placed within the vehicle 131. The satellite antennas 134-1, 134-2 may be in communication with the local antenna with a communication cable. The communication cable may follow the power cable to the satellite antennas 134-1, 134-2 or may communicate through the power cable. The satellite antennas 134-1, 134-2 may communicate with the local antenna 135 within the vehicle 131, using Ethernet standards, USB, IRBA, DSL, EIA, or other communications standards. Data processing may occur with the satellite antennas 134-1, 134-2, which may prepare the data for transmission at the local antenna 135.

A number of variations and modifications of the disclosed embodiments can also be used. For example, the vehicle described in embodiments of the invention, may be a car, train, boat, truck, bus, or airplane. Applications may extend to commercial, military or consumer applications.

The wireless satellite communication device may act as a satellite wireless access point. A wireless access point is typically a device that connects wireless communication devices together to form a wireless network. Some wireless access points are connected with a wired network, and can relay data between wireless devices and a wired network. According to embodiments of the invention, the wireless satellite communication device may act as a satellite wireless access point insofar as the wireless satellite communication device relays data between wireless devices and a satellite network. Moreover, the wireless satellite communication device may perform switching between multiple wireless devices or be a bent-pipe.

Figure 5:
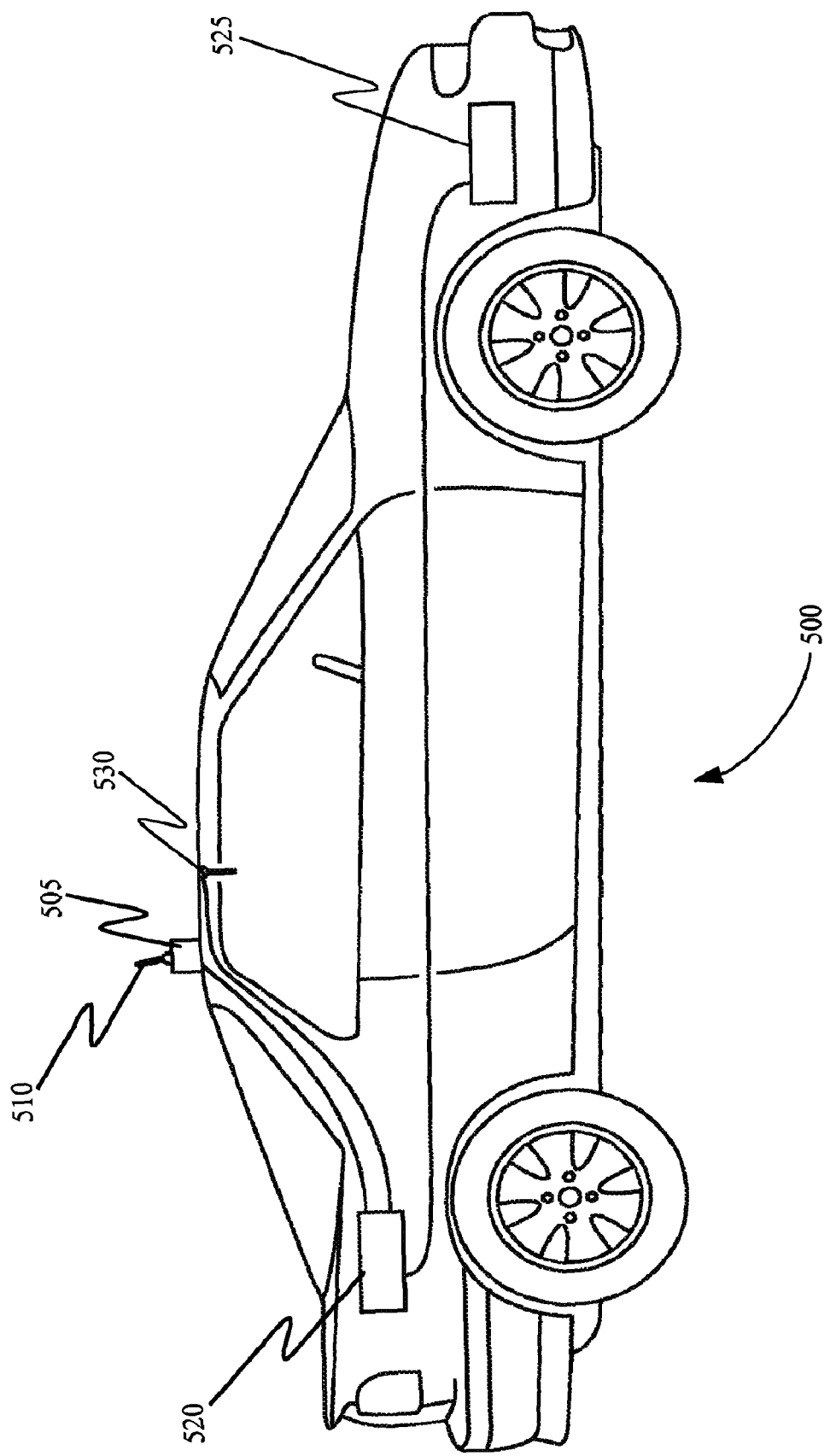
FIG. 5 shows a vehicle with a wireless satellite communication device including a satellite antenna coupled with the exterior of the vehicle and a local antenna coupled with the interior of the vehicle according to one embodiment of the invention.

FIG. 5 shows a automobile with an wireless satellite communication device 505 including a satellite antenna 510 coupled with the exterior of the automobile 500 and a local antenna 530 coupled with the interior of the automobile 500 according to one embodiment of the invention. The wireless satellite communication device may be coupled with circuitry 520 including signal processing, logic, memory, etc. located within the trunk of the automobile. This circuitry 520 may be placed anywhere within or without the vehicle. The wireless satellite communication device 505, in this embodiment of the invention, is powered using the automobile's power supply 525. The local antenna 530 is secured within the interior of the automobile 500 and a wire couples the local antenna 530 with circuitry 520.

Figure 6A:
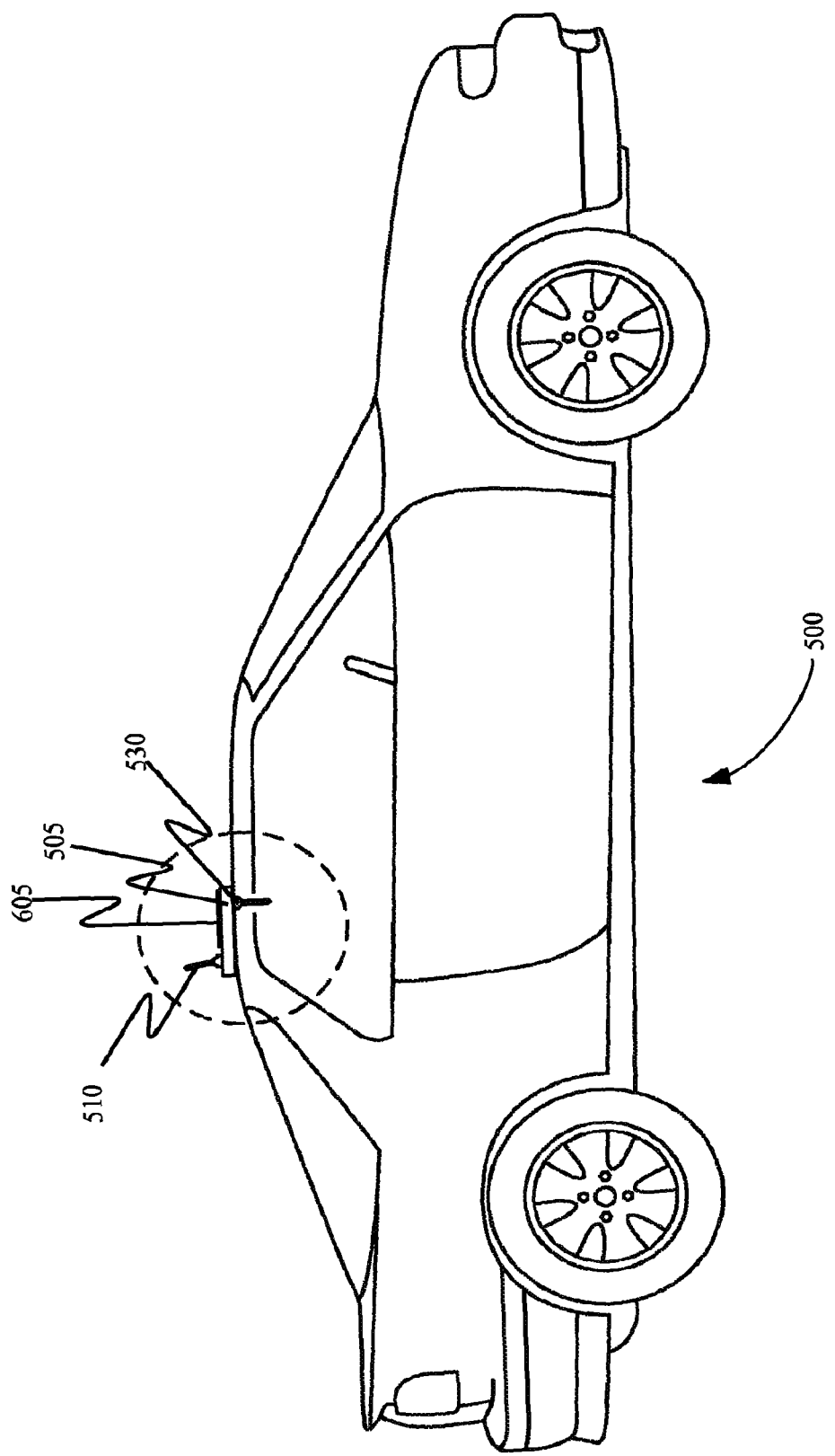
FIG. 6A shows a vehicle with a wireless satellite communication device including a satellite antenna coupled with the exterior of the vehicle, a local antenna coupled with the interior of the vehicle, and a solar panel according to one embodiment of the invention.
Figure 6B:
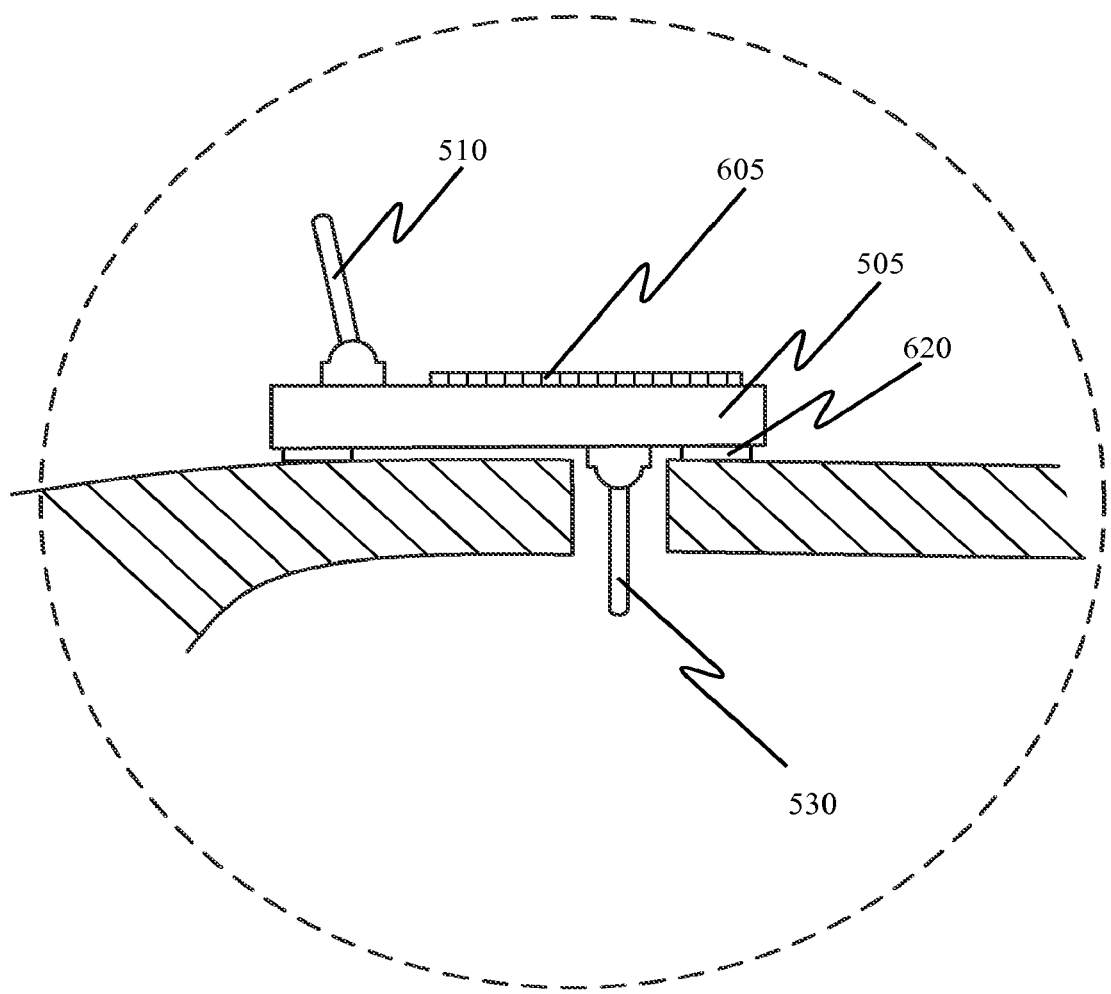
FIG. 6B shows a close up of the wireless satellite communication device shown in FIG. 6A.

FIG. 6A shows a automobile 500 with a wireless satellite communication device 505 including a satellite antenna 510 coupled with the exterior of the automobile, a local antenna 530 coupled with the interior of the vehicle, and a solar panel 605 according to one embodiment of the invention. The wireless satellite communication device is powered by the solar panel 605 independent of the automobile's power supply. The local antenna 530 is coupled with the base of the wireless satellite communication device 505 and protrudes through the exterior surface of the automobile into the interior of the automobile. In such an embodiment, the wireless satellite communication device may provide at least wireless connectivity for wireless devices within the automobile with the local antenna 530. FIG. 6B shows a close up of the wireless satellite communication device shown in FIG. 6A. In this embodiment, the wireless satellite communication device 505 is coupled with the automobile using magnets 620. Various other connectors may be used that are either removable or permanent, for example, double stick tape, screws, glue, bolts, etc.

Figure 7:
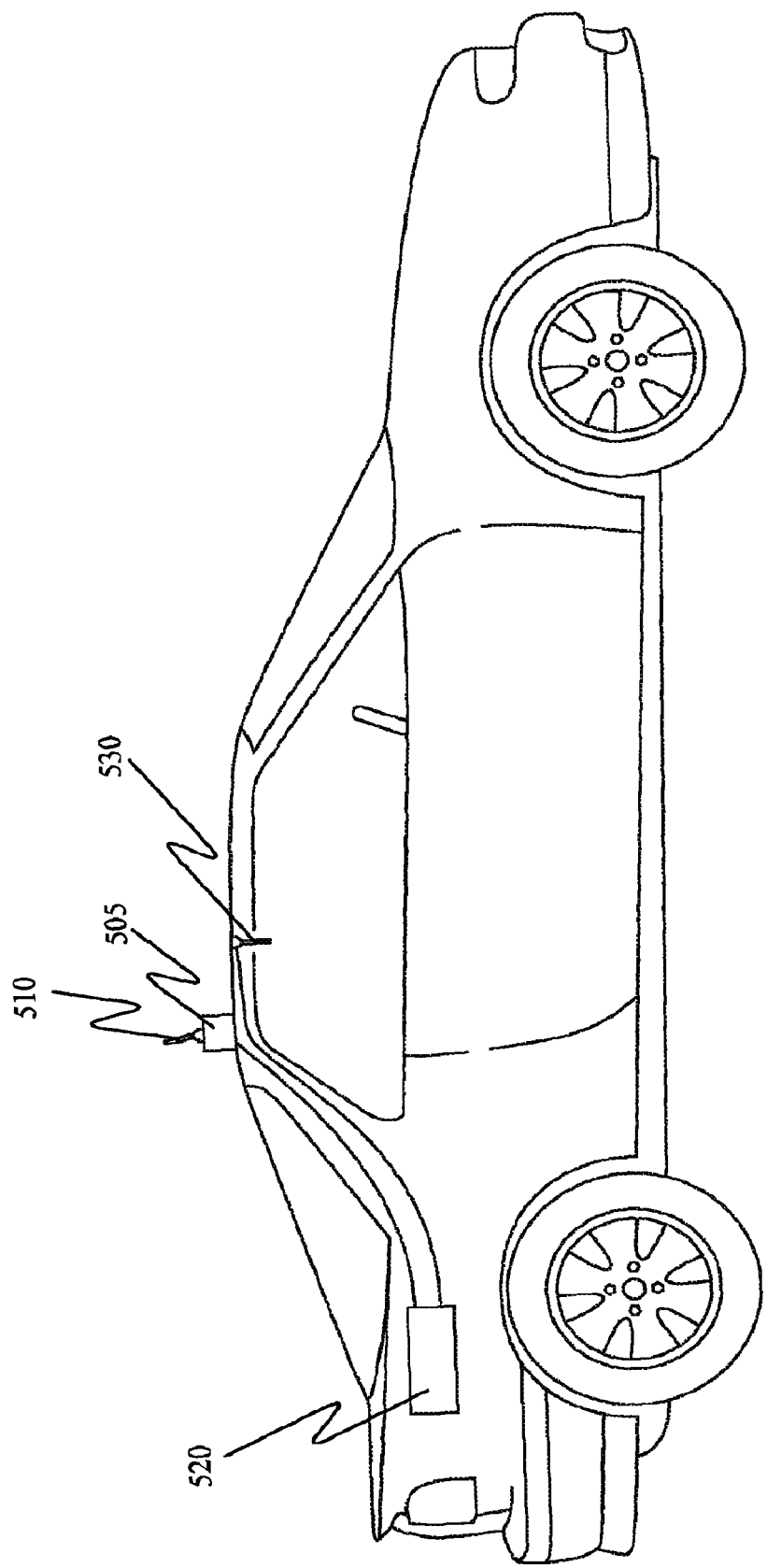
FIG. 7 shows a wireless satellite communication device including a satellite antenna coupled with the exterior of the vehicle and a local antenna coupled with the interior of the vehicle according to one embodiment of the invention.

FIG. 7 shows a wireless satellite communication device 505 including a satellite antenna 510 coupled with the exterior of the vehicle and a local antenna 530 coupled with the interior of the vehicle according to one embodiment of the invention. According to this embodiment of the invention, the wireless satellite communication device is powered independent from the automobile power supply. The circuitry 520 or wireless satellite communication device 505 may include a battery. The battery may be rechargeable.

Figure 8A:
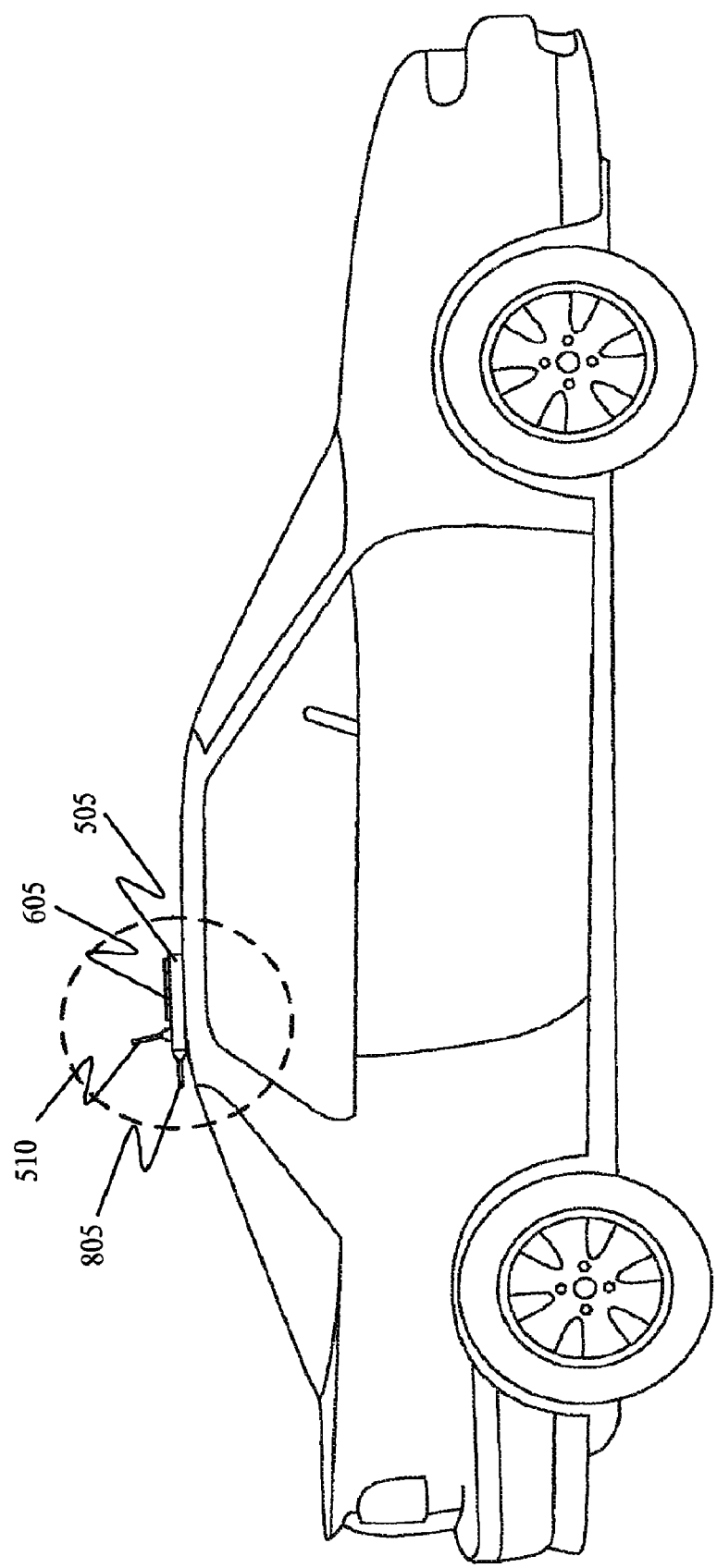
FIG. 8A shows a vehicle with a wireless satellite communication device including a satellite antenna coupled with the exterior of the vehicle, a local antenna coupled with the exterior of the vehicle, and a solar panel according to one embodiment of the invention.
Figure 8B:
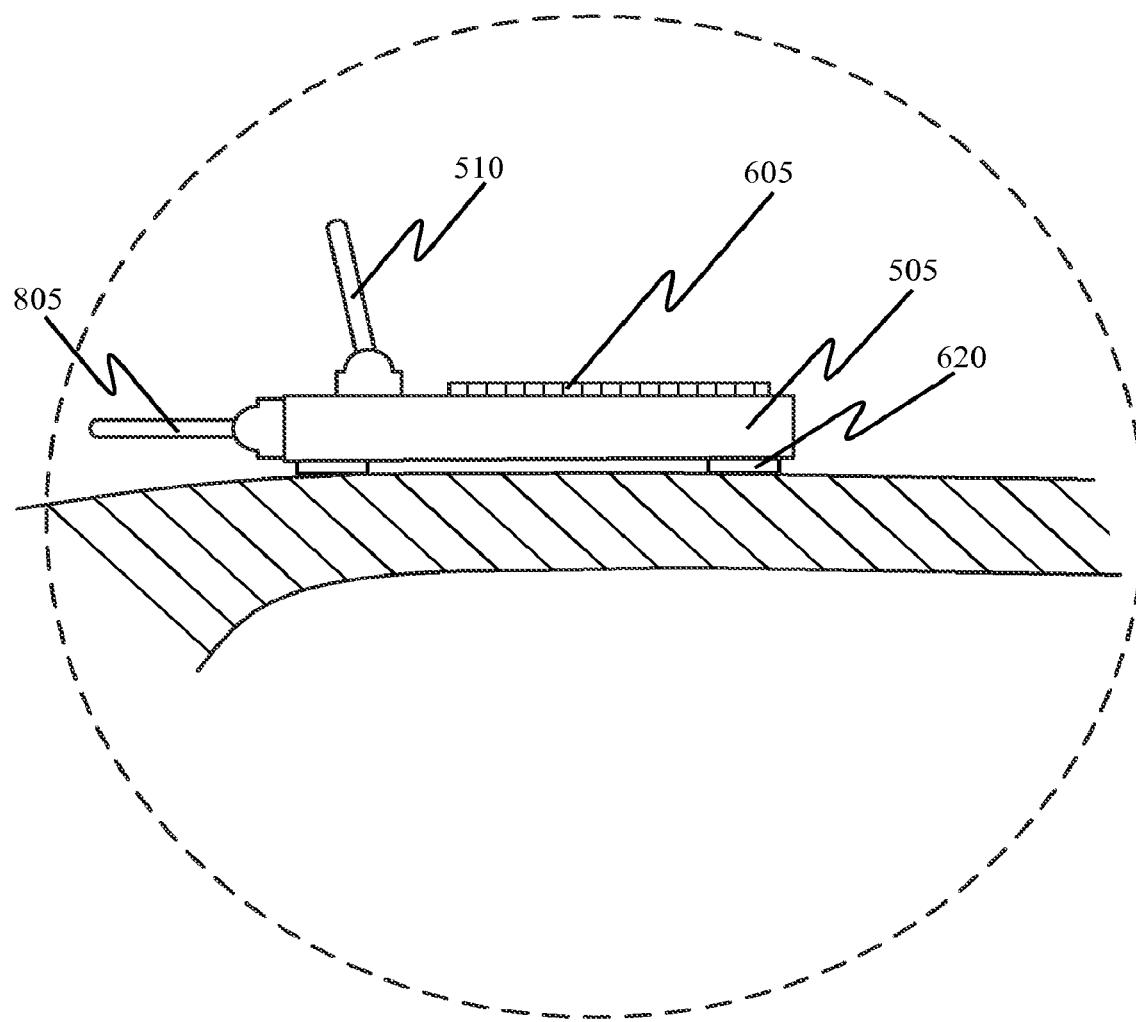
FIG. 8B shows a close up of the wireless satellite communication device shown in FIG. 8A.

FIG. 8A shows a vehicle with a wireless satellite communication device 505 including a satellite antenna 510 coupled with the exterior of the vehicle, a local antenna 805 coupled with the exterior of the vehicle, and a solar panel 605 according to one embodiment of the invention. The wireless satellite communication device is powered using the solar panel 605. The wireless satellite communication device may also be detachable from the automobile. As shown in FIG. 8B the wireless satellite communication device may be coupled with the exterior of the vehicle using magnets 620 or any other detachable material and/or device. Accordingly, the wireless satellite communication device may be mobile, providing wireless access to a network as long as sufficient solar energy is incident on the solar panel. The wireless satellite communication device may also include a battery that stores electrical energy received from the solar panel. The battery may then be used to power the wireless satellite communication device.

According to this embodiment of the invention, the wireless satellite communication device is powered independent of the vehicle power supply. As such, a user may remove the wireless satellite communication device from the vehicle. The wireless satellite communication device may be used independently from the vehicle.

The local antenna 805, according to embodiments of the invention, may have a gain pattern designed to provide increased gain to the vehicle interior and to minimize gain outside the vehicle. For example, the local antenna may include a patch antenna affixed with the rear window of the vehicle (or other location). The gain of the patch antenna may provide increased gain to the interior of the vehicle and decreased gain to the exterior of the vehicle. The gain pattern may vary from vehicle to vehicle. The gain pattern may be quickly adjusted when the wireless device is used on a new and/or different vehicle. The local antenna according to embodiments of the invention may also include a dipole antenna, an adaptive array antenna, a plurality of antennas, adaptive array antenna(s), a switched beam antenna, a phased array, a microstrip antenna, etc.

Figure 9:
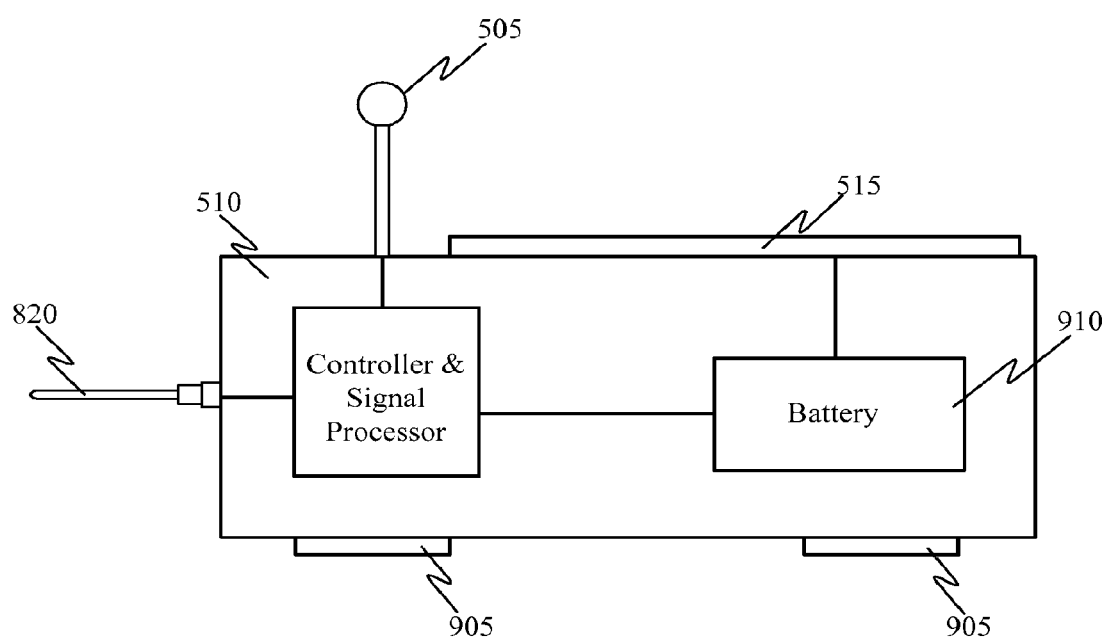
FIG. 9 shows a block diagram of a wireless satellite communication device according to one embodiment of the invention.

FIG. 9 shows a block diagram of the wireless satellite communication device 510 shown in FIGS. 8A and 8B according to one embodiment of the invention. The wireless satellite communication device 510 includes a solar panel 515, a satellite antenna 505 and a local antenna 820 as well as magnets 905 for connecting the wireless satellite communication device with a vehicle.

Figure 10:
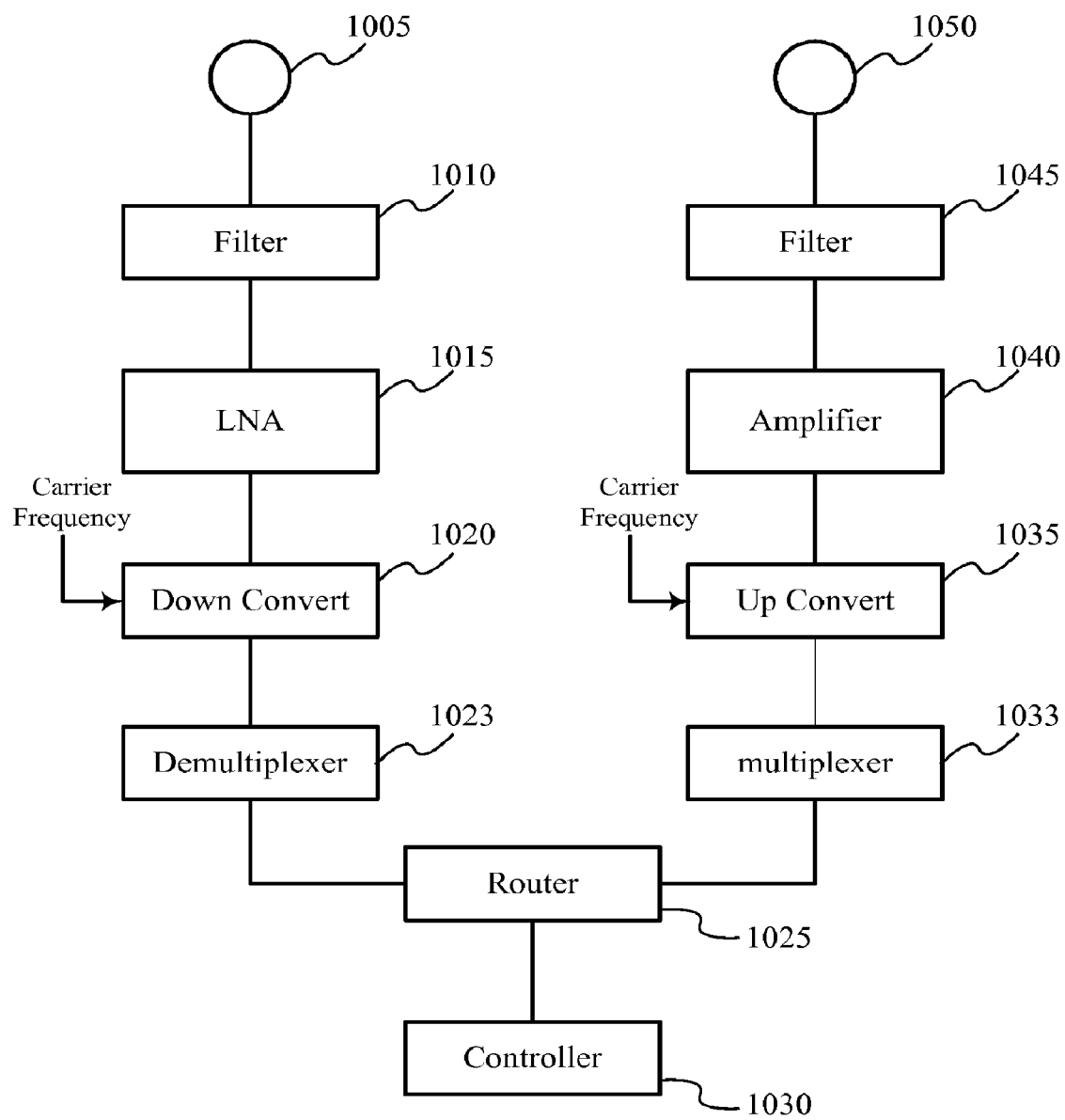
FIG. 10 shows another block diagram of a wireless satellite communication device according to one embodiment of the invention.

FIG. 10 shows another block diagram of a wireless satellite communication device according to one embodiment of the invention. A signal may be received at a satellite antenna 1005. The signal may be filtered and passed through a low noise amplifier (LNA) at blocks 1010 and 1015. The signal may be downconverted at block 1020. The signal may contain data for multiple users and may require demultiplexing at block 1023. For example, the signal may apply channel access method to allow multiple users to access the channel and receive data. For example, data may be channelized using time division multiple access, frequency division multiple access, spread spectrum multiple access, code division multiple access, space division multiple access, wavelength division multiple access and/or multi-frequency time division multiple access.

Moreover, data may be packetized within the signal. For example, data may be packetized using the following packetization techniques: aloha, slotted aloha, multiple access with collision avoidance, multiple access with collision avoidance for wireless, carrier sense multiple access, carrier sense multiple access with collision detection, carrier sense multiple access with collision avoidance, distributed coordination function, point coordination function, carrier sense multiple access with collision avoidance and resolution using priorities, token passing, token ring, token bus, polling resource reservation (scheduled) packet-mode protocols, dynamic time division multiple access, packet reservation multiple access, and/or reservation aloha.

Data is routed at the router 1025. For wireless devices connected with the wireless satellite communication device with the local antenna, the router 1025 may route data with the local antenna to the connected wireless device. Data intended for other devices are dropped at the router 1025. The router 1025 as shown is coupled with a controller 1030. The controller may also be coupled with various other components of the wireless satellite communication device. Data intended for connected wireless devices is multiplexed according to the local multiplexing scheme at the multiplexer 1033. For example, if the local antenna is configured to transmit using Wi-Fi, then the data may be multiplexed according to the IEEE 802.11 standard. This may include, for example, the combination of single carrier direct-sequence spread spectrum techniques and/or multi-carrier orthogonal frequency division multiplexing. Various other multiple access or multiplexing techniques may be used.

The data may be upconverted at block 1035, amplified at an amplifier 1040 and filtered at block 1045. The data may then be transmitted to various users with the local antenna.

While the above description describes the flow of data from a satellite antenna to a user through a local antenna, data may also be received at the local antenna and transmitted to a satellite through the satellite antenna. Those skilled in the art will recognize that the system may send and/or receive data at either and/or both antennas.

Figure 11:
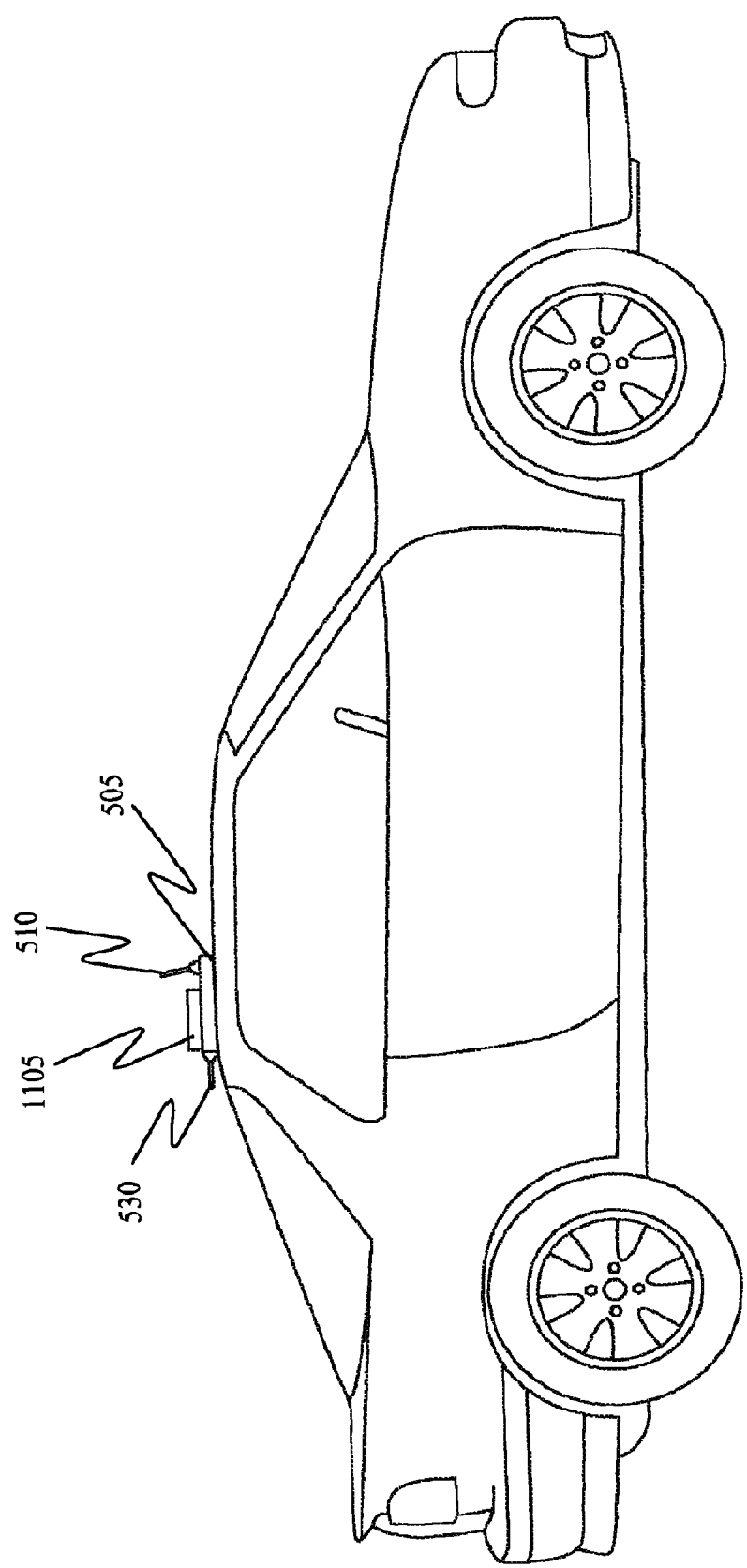
FIG. 11 shows a vehicle with a wireless satellite communication device including a satellite antenna coupled with the exterior of the vehicle, a local antenna coupled with the exterior of the vehicle, and a battery according to one embodiment of the invention.

FIG. 11 shows a vehicle with a wireless satellite communication device including a satellite antenna 510 coupled with the exterior of the vehicle, a local antenna 530 coupled with the exterior of the vehicle, and a battery 11105 according to one embodiment of the invention. Accordingly, the wireless satellite communication device is powered independent of the vehicle power supply. The wireless satellite communication device may be coupled with the vehicle using magnets or any other secure and/or removable connection technique. As such, a user may remove the wireless satellite communication device from the vehicle when the device is not in use and place the wireless satellite communication device on the vehicle when in use.

Figure 12A:
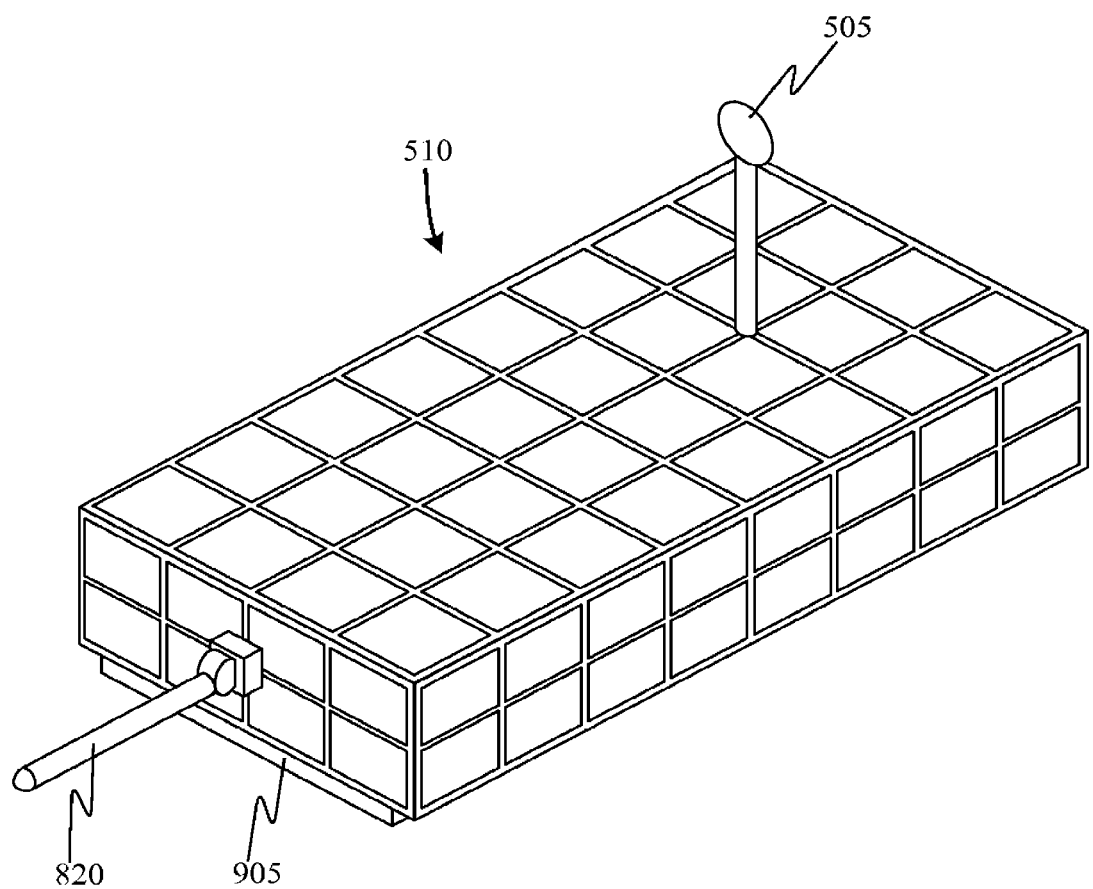
FIG. 12A shows a wireless satellite communication device with solar panels covering the surface of the device according to one embodiment of the invention.
Figure 12B:
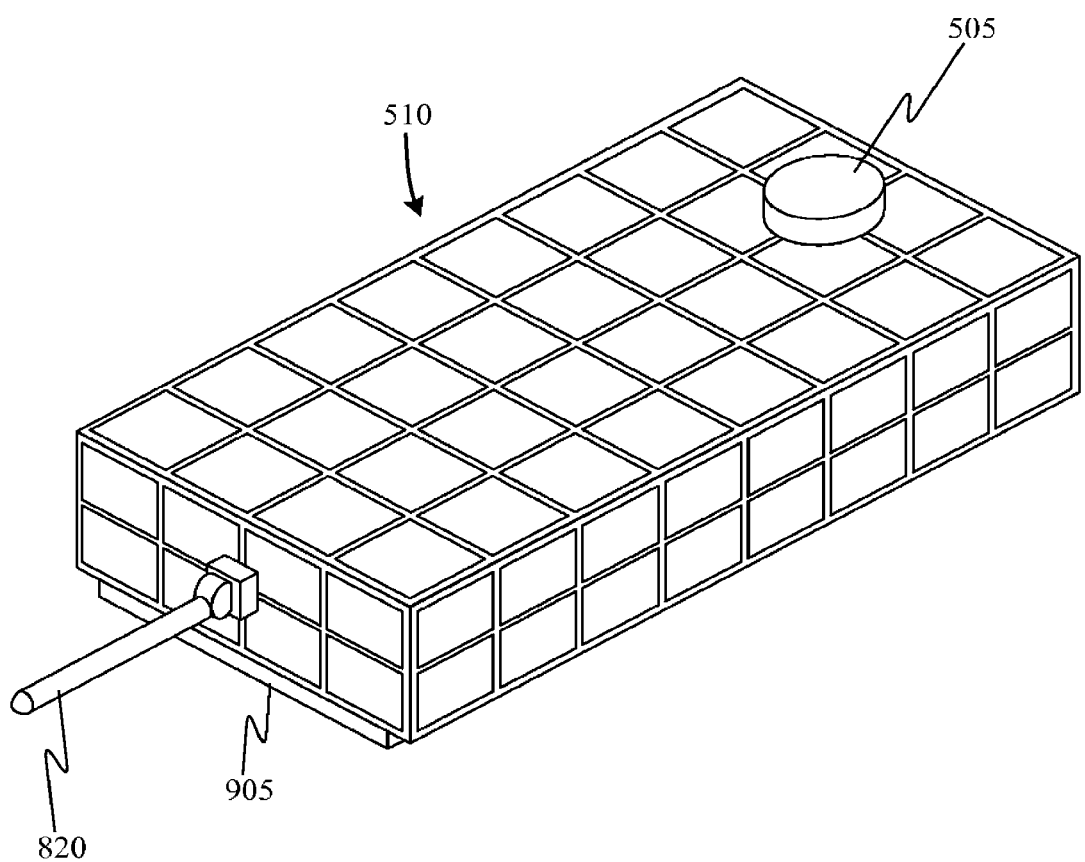
FIG. 12B shows another wireless satellite communication device with solar panels covering the surface of the device according to one embodiment of the invention.

FIGS. 12A and 12B show wireless satellite communication devices with solar panels 510 covering the surface of the device according to one embodiment of the invention. As shown in the figures, a wireless satellite communication device may include a satellite antenna 505 in various shapes and/or sizes as well as a local antenna, such as, for example, a Wi-Fi antenna. Portions of the body of the wireless satellite communication device may be covered with solar panels, enabling surfaces of the wireless satellite communication device to potentially collect and translate solar energy into electrical energy. While the wireless satellite communication device is shown as box-shaped, the wireless satellite communication device may be configured in any shape. For example, the wireless satellite communication device may be aerodynamically shaped, ergonomically shaped and/or artistically shaped. For example, the wireless satellite communication device may be fin or disc shaped. Moreover, the wireless satellite communication devices may comprise a portion of a vehicle's spoiler. For example, the wireless satellite communication devices may include a solar panel that covers all or portions of a spoiler on the vehicle.

Figure 13:
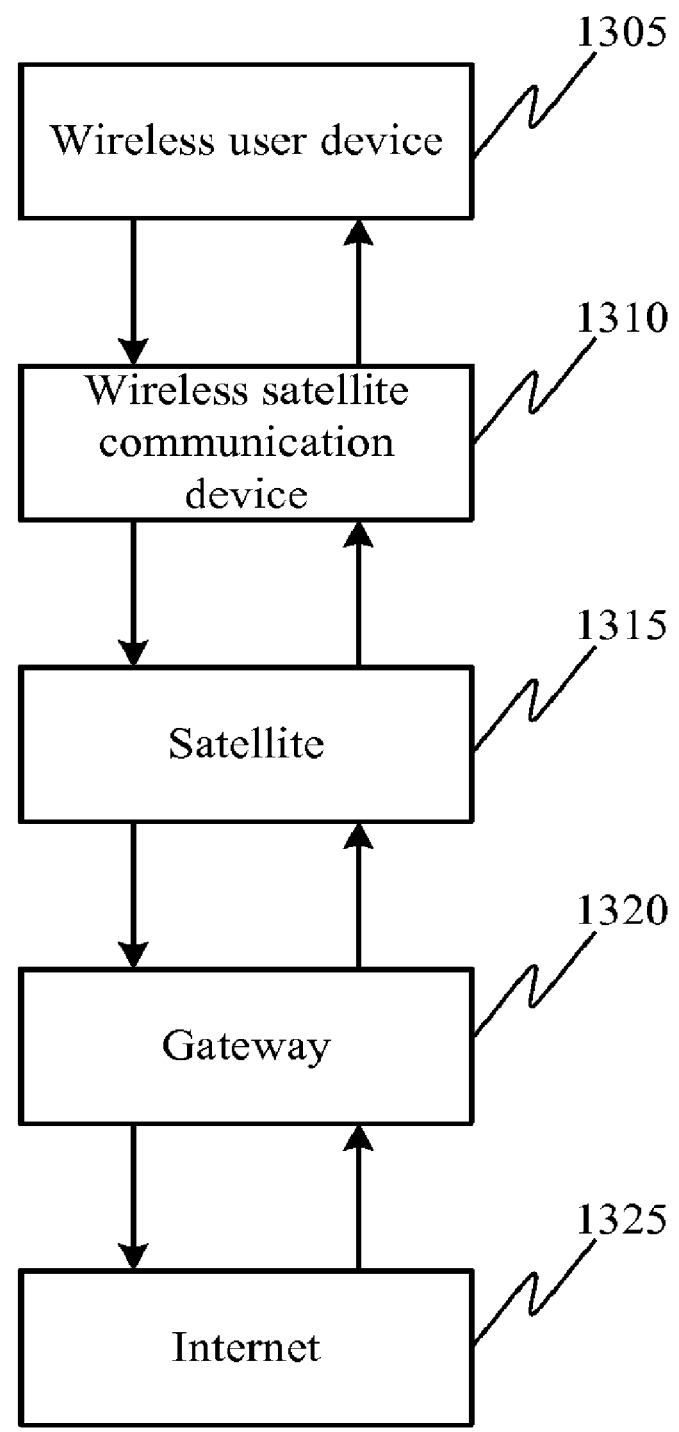
FIG. 13 shows a block diagram of data flow between the Internet and a wireless communication device using a wireless satellite communication device according to one embodiment of the invention.

FIG. 13 shows a block diagram of data flow between the Internet 1325 and a wireless user device 1305 according to one embodiment of the invention. Data may be transmitted in one or both directions. Data from a wireless user device 1305 may be transmitted to a wireless satellite communication device 1310, for example, through a wireless network. The wireless satellite communication device 1310 may communicate the data with a satellite 1310. The satellite 1310 in turn may then transfer the data to the gateway 1320. The gateway may be coupled with the Internet 1325 and the data is transferred to the appropriate address on the Internet 1325. The various connections between devices may require different and/or the same channel access schemes and/or packetization schemes. Data may be communicated in the opposite direction from the Internet 1325 to the gateway 1320 to the satellite 1315 to the wireless satellite communication device 1310 to the wireless user device 1305. Bandwidth may be allocated proportionally or disproportionally between the uplink and downlink connections from the satellite. For example, the satellite 1315 may transmit data to the wireless satellite communication device 1310 with a greater bandwidth than in the opposite direction.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Embodiments of the invention may include a wireless satellite communication device with at least two satellite antennas communicating with at least two satellites or a satellite and a non-orbital repeater. In one embodiment, each antenna may communicate with a single satellite and each using a different frequency. In another embodiment, the antennas may communicate with both satellites using the same frequency or overlapping frequencies and/or overlapping in time using MIMO, SIMO or MISO techniques. For example, MIMO techniques may be similar to those discussed above in relation to FIGS. 2A and 2B. Various other MIMO techniques may also be used.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as limitation on the scope of the disclosure.

What is claimed is:

1. A wireless satellite communication device providing a satellite communication link for wireless devices within a vehicle, comprising:
   one or more satellite antennas coupled with the vehicle and configured to communicate with one or more satellites;
   one or more local antennas coupled with the vehicle and configured to communicate with at least one or more wireless user devices within the vehicle;
   circuitry coupled with the satellite antenna and the local antenna, wherein the circuitry is configured to receive data from the satellite antenna and transmit the data with the local antenna; and
   a battery configured to provide power to at least the satellite antenna, the local antenna, and the circuitry,
   wherein the circuitry is configured to receive data from a satellite through the satellite antenna with a first channel access protocol and transmit the data with the local antenna with a second channel access protocol.

2. The wireless satellite communication device according to claim 1, wherein the wireless satellite communication device includes at least two antennas in communication with at least two satellites and the wireless satellite communication device communicates with the satellites using MIMO techniques.

3. The wireless satellite communication device according to claim 1, wherein the one or more satellite antennas are configured to communicate with one or more satellites and one or more non-orbital repeaters.

4. The wireless satellite communication device according to claim 3, wherein the wireless satellite communication device includes at least two antennas in communication with at least one satellite and at least one non-orbital repeater, and the wireless satellite communication device communicates with the satellite and the non-orbital repeater using MIMO techniques.

5. The wireless satellite communication device according to claim 1, wherein the circuitry is configured to receive data from the local antenna and transmit the data to a satellite through the satellite antenna.

6. The wireless satellite communication device according to claim 5, wherein the circuitry is configured to receive data from the local antenna with the second channel access protocol and transmit the data to the satellite through the satellite antenna with a first channel access protocol.

7. The wireless satellite communication device according to claim 1, wherein the second channel access protocol utilizes an IEEE 802.11 standard.

8. The wireless satellite communication device according to claim 1, further comprising at least one attachment member configured to couple the wireless satellite communication device with the exterior of the vehicle.

9. The wireless satellite communication device according to claim 8, wherein the attachment member comprises one or more magnets.

10. The wireless satellite communication device according to claim 1, wherein the local antenna is coupled with the exterior of a vehicle.

11. The wireless satellite communication device according to claim 1, wherein the local antenna is coupled with the interior of a vehicle.

12. The wireless satellite communication device according to claim 1, wherein the battery comprises a rechargeable battery.

13. The wireless satellite communication device according to claim 1, wherein the local antenna comprises a patch antenna.

14. The wireless satellite communication device according to claim 1, wherein the wireless satellite communication device comprises a spoiler.

15. The wireless satellite communication device according to claim 1, wherein the local antenna is configured to provide increased gain within the interior of the vehicle.

16. The wireless satellite communication device according to claim 1, further comprising a spoiler on the exterior of the vehicle.

17. A method for providing satellite communication with wireless devices within a vehicle, the method comprising:
    receiving data from one or more satellites through one or more satellite antennas coupled with the vehicle using a first channel access protocol; and
    transmitting the data to one or more wireless user devices within the vehicle through at least one local antenna coupled with the vehicle using a second channel access protocol.

18. The method according to claim 17, further comprising receiving data from one or more non-orbital receivers through the one or more satellite antennas coupled with the vehicle.

19. The method according to claim 17, wherein the data is received from the one or more satellites using MIMO techniques.

20. The method according to claim 17, wherein the local antenna is coupled with the exterior of the vehicle.

21. The method according to claim 17, wherein the local antenna is coupled with the interior of the vehicle.

22. The method according to claim 17, wherein the the second channel access protocol utilizes an IEEE 802.11 standard.

23. The method according to claim 17, further comprising:
    receiving a second set of data from the one or more wireless user devices through at least one local antenna; and
    transmitting the second set of data to the one or more satellites through one or more satellite antennas.

24. A wireless satellite communication device providing a satellite communication link for wireless devices within a vehicle, comprising:
    one or more satellite antennas coupled with the vehicle and configured to communicate with one or more satellites;
    one or more local antennas coupled with the vehicle and configured to communicate with at least one or more wireless user devices within the vehicle;
    circuitry coupled with the satellite antenna and the local antenna, wherein the circuitry is configured to receive data from the satellite antenna and transmit the data to the wireless user devices with the local antenna; and
    at least one solar panel configured to convert solar radiation to electric power and the solar panel is coupled with the satellite antenna, the local antenna, and the circuitry
    wherein the circuitry is configured to receive data from a satellite through the satellite antenna with a first channel access protocol and transmit the data with the local antenna with a second channel access protocol.

25. The wireless satellite communication device according to claim 24, wherein the one or more satellite antennas are configured to communicate with one or more satellites and one or more non-orbital repeaters.

26. The wireless satellite communication device according to claim 24, further comprising a battery coupled with the satellite antenna, the local antenna, and the circuitry and configured to store electrical power from the solar panel.

27. The wireless satellite communication device according to claim 24, wherein the second channel access protocol utilizes an IEEE 802.11 standard.

28. The wireless satellite communication device according to claim 24, wherein the circuitry is configured to receive data from the local antenna with the second channel access protocol and transmit the data to a satellite through the satellite antenna with the first channel access protocol.

* * * * *